(12) United States Patent
Wigren et al.

(10) Patent No.: US 10,356,741 B2
(45) Date of Patent: Jul. 16, 2019

(54) FINGERPRINT POSITIONING FOR MOBILE TERMINALS

(71) Applicant: Telefonaktiebolaget LM Ericsson (publ), Stockholm (SE)

(72) Inventors: Torbjörn Wigren, Uppsala (SE); Meng Wang, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/755,577

(22) PCT Filed: Sep. 11, 2015

(86) PCT No.: PCT/EP2015/070808
§ 371 (c)(1),
(2) Date: Feb. 27, 2018

(87) PCT Pub. No.: WO2017/041850
PCT Pub. Date: Mar. 16, 2017

(65) Prior Publication Data
US 2018/0279251 A1    Sep. 27, 2018

(51) Int. Cl.
*H04W 24/00*     (2009.01)
*H04W 64/00*     (2009.01)
*H04W 24/10*     (2009.01)
*G01S 5/02*      (2010.01)
*G01S 11/04*     (2006.01)
*G01S 11/06*     (2006.01)

(52) U.S. Cl.
CPC ........... *H04W 64/00* (2013.01); *G01S 5/0252* (2013.01); *G01S 5/0263* (2013.01); *G01S 11/04* (2013.01); *G01S 11/06* (2013.01); *H04W 24/10* (2013.01)

(58) Field of Classification Search
CPC ..... H04W 64/00; H04W 24/00; H04W 88/02; G01S 5/0252; G01S 11/04; G01S 11/06; H04M 1/72519; H04M 1/72522
USPC ................................ 455/456.5, 456.1, 550.1
See application file for complete search history.

(56) References Cited

U.S. PATENT DOCUMENTS

| | | | |
|---|---|---|---|
| 9,462,412 B1 * | 10/2016 | Ramachandran | ... G06F 17/3087 |
| 9,754,255 B1 * | 9/2017 | Ma | ......... G06Q 20/40 |
| 2005/0246334 A1 | 11/2005 | Tao et al. | |
| 2010/0241507 A1 * | 9/2010 | Quinn | ..................... G06Q 30/02 705/14.42 |
| 2013/0225209 A1 * | 8/2013 | Chen | ..................... G01S 5/0252 455/456.6 |

(Continued)

FOREIGN PATENT DOCUMENTS

WO    WO 2011/040856 A1    4/2011
WO    WO 2012/044246 A1    4/2012

OTHER PUBLICATIONS

International Search Report and Written Opinion of the International Searching Authority, PCT/EP2015/070808, dated May 30, 2016, 14 pages.

(Continued)

*Primary Examiner* — Danh C Le
(74) *Attorney, Agent, or Firm* — Sage Patent Group

(57) ABSTRACT

At least one of location-specific downlink properties and location-specific uplink properties of a radio link are determined and fused to obtain a location-specific fingerprint of the radio link associated with a location of a mobile device.

24 Claims, 17 Drawing Sheets

(56) References Cited

U.S. PATENT DOCUMENTS

| | | | |
|---|---|---|---|
| 2014/0099916 A1* | 4/2014 | Mallikarjunan | H04W 8/20 455/406 |
| 2014/0235328 A1* | 8/2014 | Crowder | G07F 17/32 463/25 |
| 2015/0018017 A1 | 1/2015 | Jang et al. | |
| 2015/0100330 A1* | 4/2015 | Shpits | G06F 19/3493 705/2 |
| 2017/0026779 A1* | 1/2017 | Schmidlin | H04W 4/70 |
| 2018/0164400 A1* | 6/2018 | Wirola | G01S 5/0252 |

OTHER PUBLICATIONS

Wigren, T., "Adaptive Enhanced Cell-ID Fingerprinting Localization by Clustering of Precise Position Measurements," IEEE Transactions on Vehicular Technology, vol. 56, No. 5, Sep. 1, 2007, pp. 3199-3209 (XP055272813).

\* cited by examiner

FINGERPRINT POSITIONING FOR MOBILE TERMINALS

CROSS REFERENCE TO RELATED APPLICATIONS

This application is a 35 U.S.C. § 371 national stage application of PCT International Application No. PCT/EP2015/070808 filed on Sep. 11, 2015, the disclosure and content of which is incorporated by reference herein in its entirety.

TECHNICAL FIELD

Various embodiments relate to a mobile device, an access point node, and a fingerprint repository node configured to participate in generation of location-specific fingerprints of a radio link.

BACKGROUND

Wireless communication networks are a ubiquitous part of modern life in many areas. A number of different wireless communication protocols for communication on radio links have been developed. For example, the Third Generation Partnership (3GPP) Long Term Evolution (LTE) is a set of enhancements to the 3GPP Universal Mobile Telecommunications System (UMTS) that supports high data rates, low latency, low implementation and operating costs, and a seamless connection to legacy wireless communication networks. As another example, the 3GPP Wideband Code Division Multiple Access (WCDMA) is a wideband spread-spectrum channel access protocol utilizing direct-sequence spread spectrum technology and unique codes to multiplex multiple users over a single wide frequency channel. 3GPP High Speed Packet Access (HSPA) is an extension of WCDMA protocols. HSPA transmits communication data on shared channels, in packets addressed to specific users. HSPA features short Transmission Time Interval (TTI), link adaptation, fast scheduling, fast retransmission and soft-combining, and advanced modulation, resulting in increased data rates, low latency, and increased system capacity. Yet another example of a widely-deployed protocol is the 3GPP Global System for Mobile communications (GSM). 3GPP General Packet Radio Services (GPRS) is a packet data service extension to GSM. 3GPP Enhanced Data rates for GSM Evolution (EDGE) is a 3G extension to GSM that increases the capacity and performance of GSM and GPRS networks.

Accurately determining the location of a mobile user within a communications network is an ongoing challenge. Government mandates, such as the United States Federal Communications Commission (FCC) Enhanced 911 (E-911) positioning requirements in North America, and commercial Location Based Services (LBS) demand rapid and accurate determination of the location. The E-911 requirements nowadays call for horizontal accuracy better than 50 m and vertical accuracy better than 3 m indoors. Several positioning techniques of varying accuracy and complexity are known in the art. These include Cell Identification (ID) positioning, Round Trip Timing (RTT) positioning, Time Of Arrival (TOA) positioning, Angle Of Arrival (AOA) positioning, Time Difference of Arrival (TDOA) positioning, Assisted Global Positioning System (A-GPS) positioning.

A particular technique is fingerprinting positioning, see WO 2011/040856 A1. Fingerprint positioning typically relies on a snapshot of various properties of the radio link which is specific for the location. The various properties can, in some scenarios, include RTT, TDOA, A-GPS, and cell-ID data. Fingerprint positioning techniques are thus based on comparing a plurality of location-specific downlink properties of the radio link and/or a plurality of location-specific uplink properties against a database of location-specific fingerprints (fingerprint database), each fingerprint being associated with a respective location within the wireless communication network. The fingerprint database is typically populated based on reference measurements of the plurality of location-specific uplink and/or downlink properties of the radio link and reference measurements of the associated location. Fingerprint positioning techniques allow determining the location at a comparably high precision.

However, known fingerprint positioning techniques face certain restrictions and drawbacks. E.g., in a typical indoor environment, the properties of the radio link may strongly vary as a function of location; this may be due to one or multiple reflections at walls of the indoor environment. A typical example are glass fronts being present in, e.g., malls, offices, shops, and manufacturing plants. One the one hand side, such a strong location-dependency of the properties of the radio link offers the potential of highly accurate positioning based on fingerprinting techniques. On the other hand side, in such an environment, reference implementations of the fingerprinting positioning technique sometimes achieve poor accuracy where the fingerprint database is populated with inaccurate reference measurements.

SUMMARY

Therefore, a need exists for advanced techniques of populating a fingerprint database. In particular, a need exists for techniques which enable populating the fingerprint database with fingerprints having been determined with a comparably high accuracy.

This need is met by the features of the independent claims. The dependent claims define embodiments.

According to various embodiments, a mobile device is provided. The mobile device comprises a transceiver. The transceiver is configured to transceive on a radio link between the mobile device and an access point node. The mobile device further comprises at least one processor coupled with the transceiver. The at least one processor is configured to determine a plurality of location-specific downlink properties of the radio link. The at least one processor is further configured to determine a location of the mobile device. The at least one processor is further configured to fuse the plurality of location-specific downlink properties to obtain a location-specific fingerprint of the radio link. The location-specific fingerprint is associated with the determined location of the mobile device.

According to various embodiments, a mobile device is provided. The mobile device comprises a transceiver. The transceiver is configured to transceive on a radio link between the mobile device and an access point node. The mobile device further comprises at least one processor coupled with the transceiver. The at least one processor is configured to determine a plurality of location-specific downlink properties of the radio link. The mobile device further comprises an interface coupled with the at least one processor. The interface is configured to communicate with the access point node and with the fingerprint repository node. The at least one processor is configured to receive, via the interface from the access point node, data indicative of a plurality of location-specific uplink properties of the radio link. The plurality of locations-specific uplink properties are associated with the determined location of the mobile device. The at least one processor is further configured to send, via the interface to the fingerprint repository node, data indicative of the plurality of location-specific uplink properties and the plurality of location-specific downlink properties.

According to various embodiments, a mobile device is provided. The mobile device comprises a transceiver. The transceiver is configured to transceive on a radio link between the mobile device and an access point node. The mobile device further comprises at least one processor coupled with the transceiver. The at least one processor is configured to determine a plurality of location-specific downlink properties of the radio link. The plurality of location-specific downlink properties comprises an average travel time of a plurality of packets communicated via the radio link. The at least one processor is further configured to determine a location of the mobile device. The mobile device further comprises an interface coupled with the at least one processor. The interface is configured to communicate with at least one of the access point node and a fingerprint repository node. The at least one processor is further configured to send, via the interface, data indicative of the plurality of location-specific downlink properties. The plurality of location-specific downlink properties are associated with the determined location of the mobile device.

According to various embodiments, an access point node is provided. The access point node comprises a transceiver. The transceiver is configured to transceive on a radio link between the access point node and a mobile device. The access point node further comprises an interface. The interface is configured to communicate with the mobile device. The access point node comprises at least one processor coupled with the transceiver and the interface. The at least one processor, according to some embodiments, may be configured to determine a location of the mobile device. The at least one processor is further configured to send, via the interface to the mobile device, data indicative of a plurality of location-specific uplink properties of the radio link. The plurality of location-specific uplink properties is associated with the determined location of the mobile device.

According to various embodiments, an access point node is provided. The access point node comprises a transceiver configured to transceive on a radio link between the access point node and a mobile device. The access point node further comprises an interface. The interface is configured to communicate with at least one of the mobile device and a fingerprint repository node. The access point node further comprises at least one processor coupled with the transceiver and the interface. The at least one processor is configured to determine a plurality of location-specific uplink properties of the radio link. The plurality of location-specific uplink properties comprises an average travel time of a plurality of packets communicated via the radio link. The at least one processor, according to some embodiments, may be further configured to determine a location of the mobile device. The at least one processor is further configured to send, via the interface, data indicative of the plurality of location-specific uplink properties. The plurality of location-specific uplink properties is associated with the determined location of the mobile device.

According to various embodiments, an access point node is provided. The access point node comprises a transceiver configured to transceive on a radio link between the access point node and a mobile device. The access point node further comprises an interface. The interface is configured to communicate with the mobile device and with a fingerprint repository node. The access point node further comprises at least one processor coupled with a transceiver and with the interface. The at least one processor is configured to determine a plurality of location-specific uplink properties of the radio link. The at least one processor is further configured to determine a location of the mobile device. The at least one processor is further configured to receive, via the interface from the mobile device, data indicative of a plurality of location-specific downlink properties of the radio link. The plurality of location-specific downlink properties is associated with the determined location of the mobile device. The at least one processor is further configured to fuse the plurality of location-specific uplink properties and the plurality of location-specific downlink properties to obtain a location-specific fingerprint of the radio link. The location-specific fingerprint is associated with the determined location of the mobile device.

According to various embodiments, a fingerprint repository node is provided. The fingerprint repository node comprises an interface. The interface is configured to communicate with at least one of a mobile device and an access point node. The mobile device and the access point node communicate via a radio link. The fingerprint repository node further comprises at least one processor. The at least one processor is coupled with the interface. The at least one processor is configured to receive, via the interface, data indicative of the location-specific fingerprint of the radio link. The at least one processor is configured to write the data indicative of the location-specific fingerprint to a database.

According to various embodiments, a fingerprint repository node is provided. The fingerprint repository node comprises an interface. The interface is configured to communicate with a mobile device. The mobile device and an access point node are communicating via a radio link. The fingerprint repository node further comprises at least one processor coupled with the interface. The at least one processor is configured to receive, via the interface from the mobile device, data indicative of a plurality of location-specific uplink properties of the radio link and further indicative of a plurality of location-specific downlink properties of the radio link. The plurality of location-specific uplink properties and the plurality of location-specific downlink properties are associated with a location of the mobile device. The at least one processor is further configured to fuse the plurality of location-specific uplink properties and the plurality of location-specific downlink properties to obtain a location-specific fingerprint of the radio link. The location-specific fingerprint is associated with the location of the mobile device. The at least one processor is further configured to write data indicative of the location-specific fingerprint to a database.

According to various embodiments, a fingerprint repository node is provided. The fingerprint repository node comprises an interface. The interface is configured to communicate with at least one of a mobile device and an access point node. The mobile device and the access point node communicate via a radio link. The fingerprint repository node further comprises at least one processor coupled with the interface. The at least one processor is configured to receive, via the interface, data indicative of at least one of a plurality of location-specific uplink properties and a plurality of location-specific downlink properties. The respective at least one of the plurality of location-specific uplink properties and the plurality of location-specific downlink properties comprises an average travel time of a plurality of packets communicated via the radio link and is associated with the location of the mobile device. The at least one processor is further configured to fuse the respective at least one of the plurality of location-specific uplink properties and the plurality of location-specific downlink properties to obtain a location-specific fingerprint of the radio link. The location-specific fingerprint is associated with the location of the mobile device. The at least one processor is further configured to write data indicative of the location-specific fingerprint to a database.

According to an aspect, a method is provided. The method comprises determining a plurality of location-specific downlink properties of a radio link between a mobile device and an access point node. The method further comprises determining a location of the mobile device. The method further comprises fusing the plurality of location-specific downlink properties to obtain a location-specific fingerprint of the radio link. The location-specific fingerprint is associated with the determined location of the mobile device.

According to an aspect, a computer program product is provided. The computer program product comprises program code. Executing the program code by at least one processor causes the at least one processor to execute a method. The method comprises determining a plurality of location-specific downlink properties of a radio link between a mobile device and an access point node. The method further comprises determining a location of the mobile device. The method further comprises fusing the plurality of location-specific downlink properties to obtain a location-specific fingerprint of the radio link. The location-specific fingerprint is associated with the determined location of the mobile device.

According to an aspect, a method is provided. The method comprises determining a plurality of location-specific downlink properties of a radio link. The radio link is between a mobile device and an access point node. The method further comprises determining a location of the mobile device. The method further comprises receiving, from the access point node, data indicative of a plurality of location-specific uplink properties of the radio link. The plurality of location-specific uplink properties are associated with the determined location of the mobile device. The method further comprises sending, to a fingerprint repository node, data indicative of the plurality of location-specific uplink properties and further indicative of the plurality of location-specific downlink properties.

According to an aspect, a computer program product is provided. The computer program product comprises program code. Executing the program code by at least one processor causes the at least one processor to execute a method. The method comprises determining a plurality of location-specific downlink properties of a radio link. The radio link is between a mobile device and an access point node. The method further comprises determining a location of the mobile device. The method further comprises receiving, from the access point node, data indicative of a plurality of location-specific uplink properties of the radio link. The plurality of location-specific uplink properties are associated with the determined location of the mobile device. The method further comprises sending, to a fingerprint repository node, data indicative of the plurality of location-specific uplink properties and further indicative of the plurality of location-specific downlink properties.

According to various embodiments, a method is provided. The method comprises determining a plurality of location-specific downlink properties of a radio link. The radio link is between a mobile device and an access point node. The plurality of location-specific downlink properties comprises an average travel time of a plurality of packets communicated via the radio link. The method further comprises determining a location of the mobile device. The method further comprises sending data indicative of the plurality of location-specific downlink properties. The plurality of location-specific downlink properties are associated with the determined location of the mobile device.

According to an aspect, a computer program product is provided. The computer program product comprises program code. Executing the program code by at least one processor causes the at least one processor to execute a method. The method comprises determining a plurality of location-specific downlink properties of a radio link. The radio link is between a mobile device and an access point node. The plurality of location-specific downlink properties comprises an average travel time of a plurality of packets communicated via the radio link. The method further comprises determining a location of the mobile device. The method further comprises sending data indicative of the plurality of location-specific downlink properties. The plurality of location-specific downlink properties are associated with the determined location of the mobile device.

According to various embodiments, a method is provided. The method, according to various embodiments, may comprise determining a location of a mobile device. The method further comprises sending, to the mobile device, data indicative of a plurality of location-specific uplink properties of the radio link. The radio link is between an access point node and the mobile device. The plurality of location-specific uplink properties are associated with the location of the mobile device.

According to an aspect, a computer program product is provided. The computer program product comprises program code. Executing the program code by at least one processor causes the at least one processor to execute a method. The method, according to various embodiments, may comprise determining a location of a mobile device. The method further comprises sending, to the mobile device, data indicative of a plurality of location-specific uplink properties of the radio link. The radio link is between an access point node and the mobile device. The plurality of location-specific uplink properties are associated with the location of the mobile device.

According to various embodiments, a method is provided. The method, according to various embodiments, may comprise determining a plurality of location-specific uplink properties of a radio link. The radio link is between an access point node and a mobile device. The plurality of location-specific uplink properties comprises an average travel time of a plurality of packets communicated via the radio link. The method further comprises determining a location of the mobile device. The method further comprises sending data indicative of the plurality of location-specific uplink properties. The plurality of location-specific uplink properties is associated with the location of the mobile device.

According to an aspect, a computer program product is provided. The computer program product comprises program code. Executing the program code by at least one processor causes the at least one processor to execute a method. The method, according to various embodiments, may comprise determining a plurality of location-specific uplink properties of a radio link. The radio link is between an access point node and a mobile device. The plurality of location-specific uplink properties comprises an average travel time of a plurality of packets communicated via the radio link. The method further comprises determining a location of the mobile device. The method further comprises sending data indicative of the plurality of location-specific uplink properties. The plurality of location-specific uplink properties is associated with the location of the mobile device.

According to various embodiments, a method is provided. The method comprises determining a plurality of location-specific uplink properties of a radio link. The radio link is between an access point node and the mobile device. The method further comprises determining a location of the mobile device. The method further comprises receiving, from the mobile device, a plurality of location-specific downlink properties of the radio link. The plurality of location-specific downlink properties are associated with the determined location of the mobile device. The method further comprises fusing the plurality of location-specific uplink properties and the plurality of location-specific downlink properties to obtain a location-specific fingerprint of the radio link. The location-specific fingerprint is associated with the determined location of the mobile device.

According to an aspect, a computer program product is provided. The computer program product comprises program code. Executing the program code by at least one processor causes the at least one processor to execute a method. The method comprises determining a plurality of location-specific uplink properties of a radio link. The radio link is between an access point node and the mobile device. The method further comprises determining a location of the mobile device. The method further comprises receiving, from the mobile device, a plurality of location-specific downlink properties of the radio link. The plurality of location-specific downlink properties are associated with the determined location of the mobile device. The method further comprises fusing the plurality of location-specific uplink properties and the plurality of location-specific downlink properties to obtain a location-specific fingerprint of the radio link. The location-specific fingerprint is associated with the determined location of the mobile device.

According to various embodiments, a method is provided. The method comprises a fingerprint repository node receiving data indicative of the location-specific fingerprint of the radio link. The method further comprises writing the data indicative of the location-specific fingerprint to a database.

According to an aspect, a computer program product is provided. The computer program product comprises program code. Executing the program code by at least one processor causes the at least one processor to execute a method. The method comprises a fingerprint repository node receiving data indicative of the location-specific fingerprint of the radio link. The method further comprises writing the data indicative of the location-specific fingerprint to a database.

According to various embodiments, a method is provided. The method comprises a fingerprint repository node receiving, from a mobile device, data indicative of a plurality of location-specific uplink properties of a radio link. The radio link is between the mobile device and an access point node. The method further comprises the fingerprint repository node receiving, from the mobile device, data indicative of a plurality of location-specific downlink properties of the radio link and further indicative of a plurality of location-specific uplink properties of the radio link. The plurality of location-specific uplink properties and the plurality of location-specific downlink properties are associated with the location of the mobile device. The method further comprises fusing the plurality of location-specific uplink properties and the plurality of location-specific downlink properties to obtain a location-specific fingerprint of the radio link. The location-specific fingerprint is associated with the location of the mobile device. The method further comprises writing data indicative of the location-specific fingerprint to a database.

According to an aspect, a computer program product is provided. The computer program product comprises program code. Executing the program code by at least one processor causes the at least one processor to execute a method. The method comprises a fingerprint repository node receiving, from a mobile device, data indicative of a plurality of location-specific uplink properties of a radio link. The radio link is between the mobile device and an access point node. The method further comprises the fingerprint repository node receiving, from the mobile device, data indicative of a plurality of location-specific downlink properties of the radio link and further indicative of a plurality of location-specific uplink properties of the radio link. The plurality of location-specific uplink properties and the plurality of location-specific downlink properties are associated with the location of the mobile device. The method further comprises fusing the plurality of location-specific uplink properties and the plurality of location-specific downlink properties to obtain a location-specific fingerprint of the radio link. The location-specific fingerprint is associated with the location of the mobile device. The method further comprises writing data indicative of the location-specific fingerprint to a database.

According to an aspect, a method is provided. The method comprises a fingerprint repository node receiving data indicative of at least one of a plurality of location-specific uplink properties of a radio link and a plurality of location-specific downlink properties of the radio link. The radio link is between a mobile device and an access point node. The respective at least one of the plurality of location-specific uplink properties and the plurality of location-specific downlink properties comprises an average travel time of a plurality of packets communicated via the radio link. The respective at least one of the plurality of location-specific uplink properties and the plurality of location-specific downlink properties is associated with a location of the mobile device. The method further comprises fusing the respective at least one of the plurality of location-specific uplink properties and the plurality of location-specific downlink properties to obtain a location-specific fingerprint of the radio link associated with the location of the mobile device. The method further comprises writing data indicative of the location-specific fingerprint to a database.

According to an aspect, a computer program product is provided. The computer program product comprises program code. Executing the program code by at least one processor causes the at least one processor to execute a method. The method comprises a fingerprint repository node receiving data indicative of at least one of a plurality of location-specific uplink properties of a radio link and a plurality of location-specific downlink properties of the radio link. The radio link is between a mobile device and an access point node. The respective at least one of the plurality of location-specific uplink properties and the plurality of location-specific downlink properties comprises an average travel time of a plurality of packets communicated via the radio link. The respective at least one of the plurality of location-specific uplink properties and the plurality of location-specific downlink properties is associated with a location of the mobile device. The method further comprises fusing the respective at least one of the plurality of location-specific uplink properties and the plurality of location-specific downlink properties to obtain a location-specific fingerprint of the radio link associated with the location of the mobile device. The method further comprises writing data indicative of the location-specific fingerprint to a database.

It is to be understood that the features mentioned above and those yet to be explained below may be used not only in the respective combinations indicated, but also in other combinations or in isolation without departing from the scope of the invention.

BRIEF DESCRIPTION OF THE DRAWINGS

The foregoing and additional features and effects of the invention will become apparent from the following detailed description when read in conjunction with the accompanying drawings, in which like reference numerals refer to like elements.

DETAILED DESCRIPTION OF EMBODIMENTS

Figure 1:
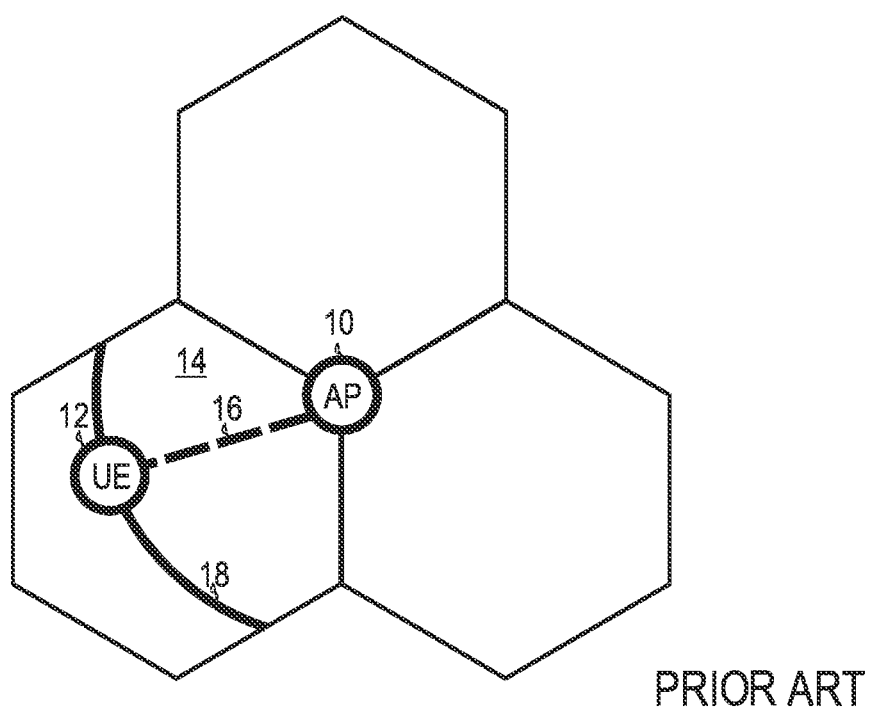
FIG. 1 schematically illustrates a TOA positioning technique according to reference implementations.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of populating a fingerprint database with fingerprints indicative of location-specific properties of a radio link are disclosed (offline stage). The properties may be indicative of an uplink (UL) channel of the radio link and/or may be indicative of a downlink (DL) channel of the radio link. The techniques allow for a flexible distribution of logic between a mobile device (UE), an access point node (AP), and a fingerprint repository node of a communications network. The UE and the AP communicate on the radio link.

The fingerprint database can be later on employed for fingerprint positioning to determine a location of a UE at a high accuracy (Showtime). Thus, Showtime may refer to the situation where the fingerprint database has been populated and using fingerprint positioning employing the fingerprint database is available to clients. Thus, Showtime may refer to a scenario where a plurality of location-specific UL properties and/or a plurality of location-specific DL properties are matched with the entries of the fingerprint database and the location of the best-matching fingerprint is assumed to be the current location of the requesting client. In such a scenario during Showtime, the location is determined in response to accessing the fingerprint database. It is typically not required to employ other positioning techniques. Compared to other positioning techniques, the fingerprinting technique can be advantageous when handling relatively complicated environments, e.g., non-line of sight scenarios. This usually requires a high-resolution fingerprint map that is obtained by comprehensive reference measurements throughout a target area; a fingerprint database is thereby populated by storing a plurality of fingerprints associated with different locations.

The fingerprint map may be radio link-specific. However, the particular type of radio link employed is not germane to the functioning of the techniques disclosed herein. E.g., the radio link may operate according to the 3GPP LTE or UMTS radio access technology (RAT) or any other cellular mobile communications network RAT. In various scenarios, Machine Type Communication (MTC) may be employed.

This may be in particular helpful where the database is partly populated during Showtime. In other scenarios, the radio link may operate according to the upcoming 3GPP 5G technology. In still further scenarios, the radio link may operate according to the Institute of Electrical and Electronics Engineers (IEEE) 802.11 RAT, referred to as Wireless Local Area Network (WLAN). While in principle the particular technology of the radio link is not germane to the functioning of the techniques of populating a fingerprint database, in various scenarios radio link-specific techniques may be employed, e.g., certain positioning and/or signaling techniques, etc.

In various scenarios, the location of a UE is determined when populating the fingerprint database. The UE may be referred to as a test UE. E.g., the UE may be implemented as an autonomously moving machine or robot.

The location can be associated with a respective fingerprint. For various scenarios as disclosed herein, the location may be determined at different accuracies, e.g., at accuracies varying between several hundreds of meters and several centimeters. E.g., the location may be determined in a two-dimensional (2D) reference system or a three-dimensional (3D) reference system. The determined location is used to populate a fingerprint database to facilitate positioning employing the fingerprint positioning technique during Showtime. Thus, the location of the UE is associated with a fingerprint which is eventually stored in the fingerprint database with the respective location of the UE. In this respect, the determining of the location of the UE when populating the fingerprint database may rely on a reference positioning technique, several of which are explained in more detail further below. If, later on and during Showtime, clients request positioning based on a plurality of location-specific properties of the radio link, such properties are compared against the entries of the fingerprint database and the associated locations that are obtained from the reference positioning technique are provided to the clients. Thus, a higher accuracy in the reference positioning technique typically allows for a higher accuracy of the fingerprint positioning.

For populating the fingerprint database, a UE collects measurements at various locations. The measurements may include raw measurement data such as measured UL quantities and/or DL quantities of a signal communicated on the radio link, the location of the UE determined based on the reference positioning technique, etc. Measurements can be collected during a planned surveying operating. Here, a UE, e.g., according to some plan, visits a plurality of locations. In such a "walk around" mode, the UE retrieves a plurality of measured DL quantities of a signal communicated on the radio link from a transceiver. Alternatively or additionally, the AP may retrieve measured UL quantities of the signal communicated on the radio link from its transceiver. Each set of UL quantities and/or DL quantities is associated with a respective location of the UE. For this, the location of the UE is determined and the UL quantities and/or DL quantities are measured substantially at the determined location. Synchronization between the UE and the AP can be required to this end to measure the data at substantially the same point in time and the same location. To discriminate between the various locations, e.g., the location of the UE may be sampled at pre-determined intervals. Time tags or a numbering scheme may be implemented for keeping track of measurements performed at different locations for later association. Planned surveying allows to extensively cover a measurement area. However, collection of data can take significant time. Another approach is to collect data opportunistically during Showtime, i.e., implement measurements of opportunity. Such an approach may be supported by clustering of highly accurate location measurements. Geographical descriptions of the clusters should be employed. This allows for a bottom-up population of the fingerprint database; however, sometimes, measurements gaps may exist and it may be difficult to employ reference positioning techniques at a high accuracy.

Each set of measured DL and/or UL quantities may be processed to obtain a plurality of location-specific DL properties and/or UL properties; the DL properties and/or the UL properties can be later on fused to obtain a fingerprint. The fingerprints thus obtained for different locations can be used to populate the fingerprint database. The fingerprinting map is obtained by the plurality of fingerprints associated with different locations and stored in the fingerprint database.

As mentioned above, the specific type of the reference positioning technique is not germane for the functioning of the techniques of populating the fingerprint database. Hereinafter, various reference positioning techniques are illustrated. Such techniques may be combined with each other to obtain more accurate results.

Reference Positioning Technique: Cell ID Positioning

The description herein of cell ID positioning is directed toward the 3GPP WCDMA radio access technology (RAT). However, a respective polygon format can be readily applied to other RATs, such as 3GPP LTE or 3GPP GSM RATs where a simpler cell may be used. In any event, the description of specific cell and data structures is exemplary only, and not limiting.

For Cell ID Positioning, a communications network is typically divided into cells, each cell served by one or more specific APs, referred to in LTE as evolved NodeB (eNB) (cellular mobile communications network). Sometimes, APs are also termed base station, radio base station, or base transceiver station. An AP may generally serve more than one cell.

For Cell ID Positioning, the cell where a specific UE is located, is determined. Hence, after determination of the geographical area covered by a specific cell, it can be stated that the UE is located somewhere within that geographical area, as long as it is connected to the network. The reported cell ID of the serving cell corresponds to the cell identity of the particular geographical area.

In several systems, including the WCDMA system, the preferred representation of the geographical extension of the cell is given by a cell polygon format. This format is described in the 3GPP Technical Specification (TS) 23.032, "Universal Geographical Area Description (GAD)". Here, the extension of a cell is described by three to fifteen corners of a closed polygon which does not intersect itself, cf. FIG. 1 where the cell 14 served by the AP 10 has six corners. The format is typically 2D and the corners are determined as pairs of longitudes and latitudes in the WGS84 geographical reference system. In the scenario of FIG. 1 the accuracy with which is location of the UE 12 is determined corresponds to the extensions of the cell 14 and may be, therefore, comparably inaccurate.

To obtain better accuracies, cell ID positioning may be augmented by determining the RTT for packets communicated on the radio link between the AP 10 and the UE 12.

Reference Positioning Technique: RTT and Timing Advance Positioning

The RRT positioning technique augments the cell ID with RTT in WCDMA or timing advance in GSM and LTE measurements. This principle for enhanced cell identity positioning aims at combining the cell extension model, e.g., modeled by a polygon, with a distance measure. The measurement principle is also depicted in FIG. 1. The travel time of radio waves from the AP 10 to the UE 12 in the cell 14, and back, is measured, with the latency of the terminal subtracted. The distance 16 from the access point 10 to UE 12 then follows from the formula $$r = c\frac{RTT}{2}$$

where RTT is the round trip time and c is the speed of light.

The RTT defines a circle—or if the inaccuracy is accounted for, a circular strip 18, around the AP 10. By combining this information with the cell polygon, left and right angles of the circular strip 18 can be computed. The UE 12 location is determined somewhere at the intersection of the serving cell 14 and the circular strip 18. The main challenge are non line of sight scenarios which have the potential of introducing uncertainty to the time measurement.

Reference Positioning Technique: TDOA

Figure 2:
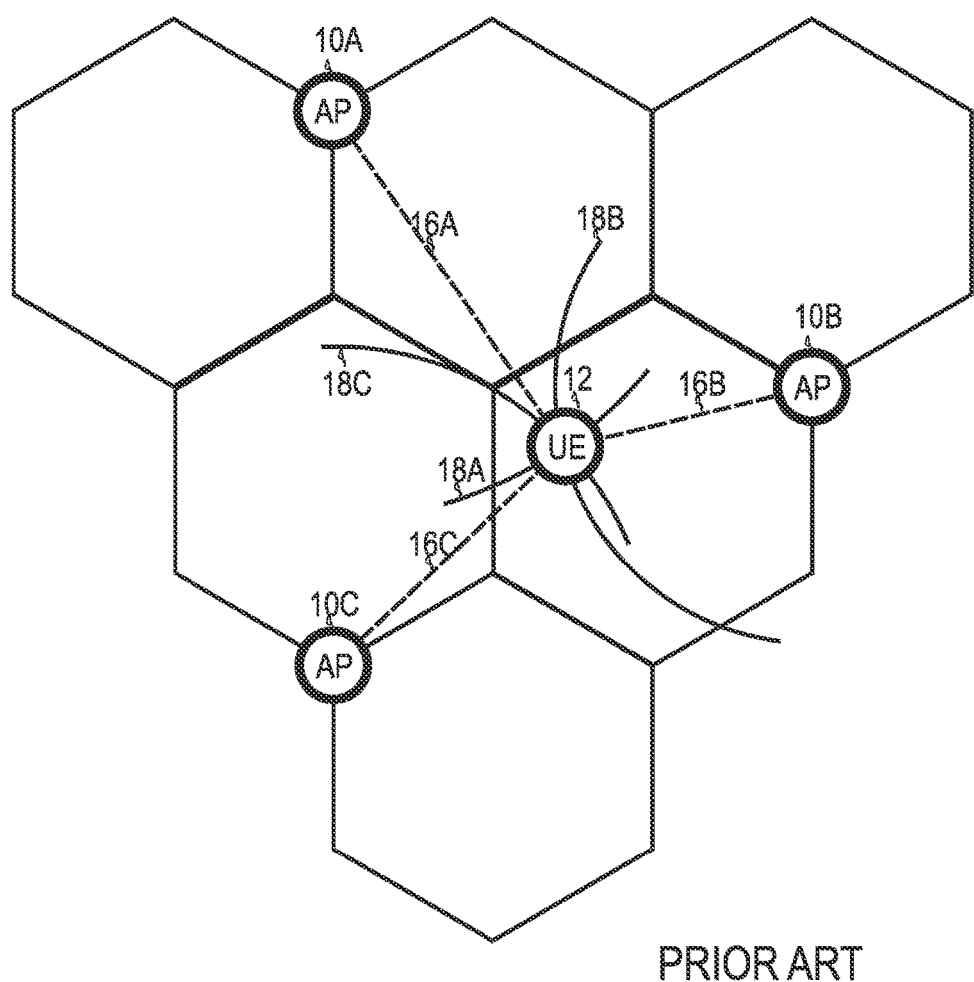
FIG. 2 schematically illustrates a TDOA positioning technique according to reference implementations.

The TDOA, in some specific scenarios also referred to as Observed Time Difference Of Arrival (OTDOA), positioning technique relies on measurements, typically of some pilot radio signal, from multiple APs. The measurement is performed by means of correlation with the known signals of the APs measured upon. A representative TDOA setup is depicted in FIG. 2. Hyperbolas 18A-18C, representing time differences obtained between APs 10A-10C, are constructed. The intersection of said hyperbolas 18A-18C determines the location of the UE 12.

The following relations between the measured TOAs in the UE 12, the transmission times from the APs 10A-C, and the distances 16A-C between the UE 12 and the APs 10A-C follow:

$$t_{TOA,i} + b_{clock} = T_i + \|r_i - r_{Terminal}\|/c$$

$$t_{TOA,n} + b_{clock} = T_n + \|r_n - r_{Terminal}\|/c.$$

where $t_{TOA,i}$, i=1, . . . , n denotes the measured time of arrivals (TOA) at the UE 12. $T_i$, i=1, . . . , n denotes the transmission times from the APs 10A-10C and c is the speed of light. The boldface quantities are the (vector) locations of the APs 10A-10C and the UE 12. $b_{clock}$ denotes the unknown clock bias of the UE 12 with respect to system time of the network.

For TDOA positioning, TOA differences are formed according to:

$$t_{TDOA,2} = t_{TOA,2} - t_{TOA,1} = T_2 - T_1 + \|r_2 - r_{Terminal}\|/c - \|r_1 - r_{Terminal}\|/c$$

$$t_{TODA,n} = t_{TOA,n} - t_{TOA,1} = T_n - T_1 + \|r_n - r_{Terminality}\|/c - \|r_1 - r_{Terminal}\|/c.$$

In these n-1 equations, the left-hand sides are known, e.g., with some additional measurement error, provided that the time of transmission differences—denoted the real time differences—can be measured. This is normally achieved with dedicated hardware called location measurement units (LMUs), or by other procedures. Further, the locations of the APs $r_i$, i=1, . . . , n, can be surveyed and so they are known as well. What remains unknown is the UE 12 location, i.e., $$r_{Terminal} = (x_{Terminal} \; y_{Terminal} \; z_{Terminal})^T.$$

Here, a 3D positioning is performed. In other scenarios, a 2D positioning is performed. The unknown location of the UE 12 is then given by:

$$r_{Terminal} = (x_{Terminal} \; y_{Terminal})^T.$$

It then follows that at least three TDOA measurements are needed (cf. FIG. 2) in order to find a 3D terminal position and that at least two TDOA measurements are needed in order to find a 2D terminal location. This, in turn, means that at least four sites need to be detected for 3D UE positioning and at least three sites need to be detected for 2D terminal positioning. In practice, accuracy of determining the location can be improved if more measurements are collected and a maximum likelihood solution is introduced. There may also be multiple (false) solutions in cases where only a minimum number of sites are detected. As can be seen from the above, for TDOA positioning, there must be at least three such hyperbolas 18A-18C determined so that the location can be derived as the intersection of the three hyperbolas 18A-18C created by the measured distances 16A-16C. In addition, given the TOA difference between the UE 12 and the APs 10A-10C, other trilateration-based algorithms, for example, hyperbolic trilateration, can also be applied.

The TDOA method belongs to the set of high precision positioning methods. However, the inaccuracy is significantly larger than that of A-GPS. The main advantage of TDOA is that it provides high precision positioning also indoors, a situation where the availability of A-GPS is very limited.

Reference Positioning Technique: Satellite-Based Positioning

A-GPS positioning is an enhancement of the Global Positioning System (GPS). GPS reference receivers are attached to a communications network and collect assistance data from GPS satellites, such as ephemeris data. The assistance data, when transmitted to GPS receivers in the respective UEs connected to the communications network, enhance the performance of the GPS receivers of the UEs.

Typically, A-GPS accuracy can become as good as ten meters without differential operation. The accuracy becomes worse in dense urban areas and indoors where the sensitivity is often not high enough for detection of the very weak signals from the GPS satellites. Satellite based positioning like A-GPS positioning typically exhibits a limited accuracy in indoor scenarios. This may be due to radio propagation losses through walls, coated windows, and dense roofs which effectively shield the radio waves from the indoor environment. Sometimes position fixes can be achieved indoors with this technology near windows and in residential homes that are less dense than office buildings and commercial facilities.

Reference Positioning Technique: AoA Positioning

Figure 3A:
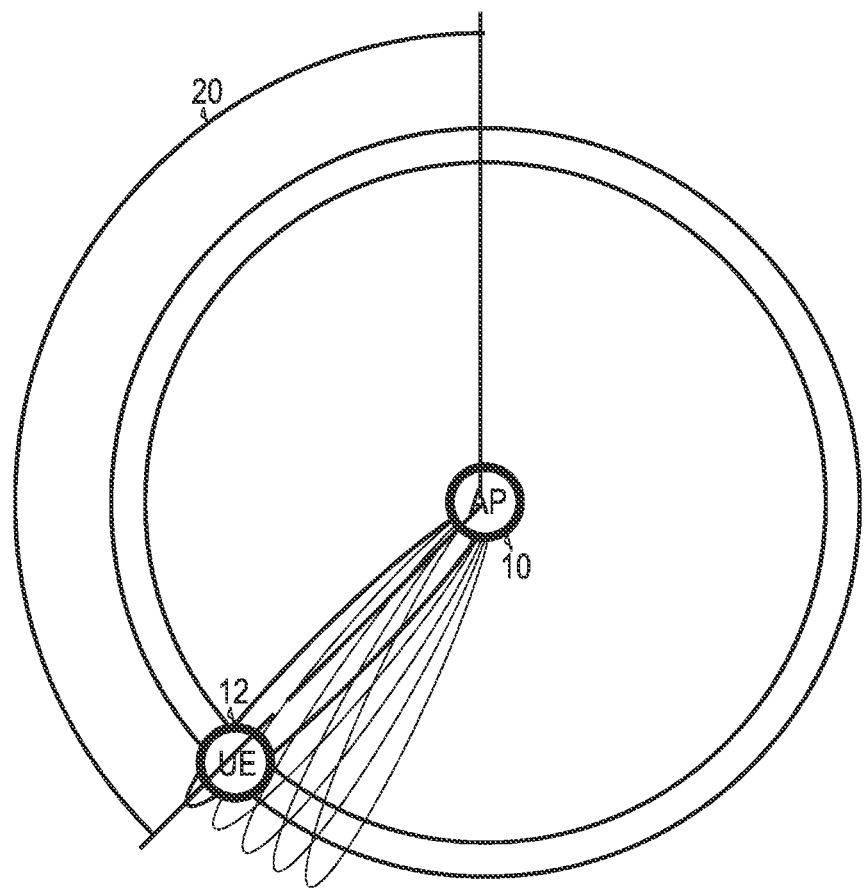
FIG. 3A schematically illustrates an AOA positioning technique according to reference implementations.

FIG. 3A illustrates aspects of AoA (Angle of Arrival) positioning. AoA positioning exploits multiple antenna elements of an antenna array of a UE 12 to measure the AoA 20 of radio waves sent by the AP 10 and impinging on the antenna array. Typically, AoAs measured in non-colocated sites are required to compute a location of the UE 12 in the plane by means of triangulation. This typically makes pure AoA positioning a multi-cell technology, a fact that may increase the complexity and cost of implementation significantly. Further, in rural regions base station geometry may not allow measurement at multiple sites.

To alleviate these drawbacks, a solution is to combine AoA with RTT which enables implementation in a single cell. Since AoA and RTT provide essentially independent measurements for direction at the location of the UE 12, the accuracy of such a method can be comparably high, in particular in situations where radio propagation is good having only small multipath and non-line of sight effects. This can be the case in rural areas without hills.

AoA techniques can be principally applied to the WLAN RAT. Direction finding applications are conceivable which rely on the WLAN RAT. AoA can also be applied to 3GPP-specified RATs.

Reference Positioning Technique: Fine Timing Measurement (FTM) Technique

Figure 3B:
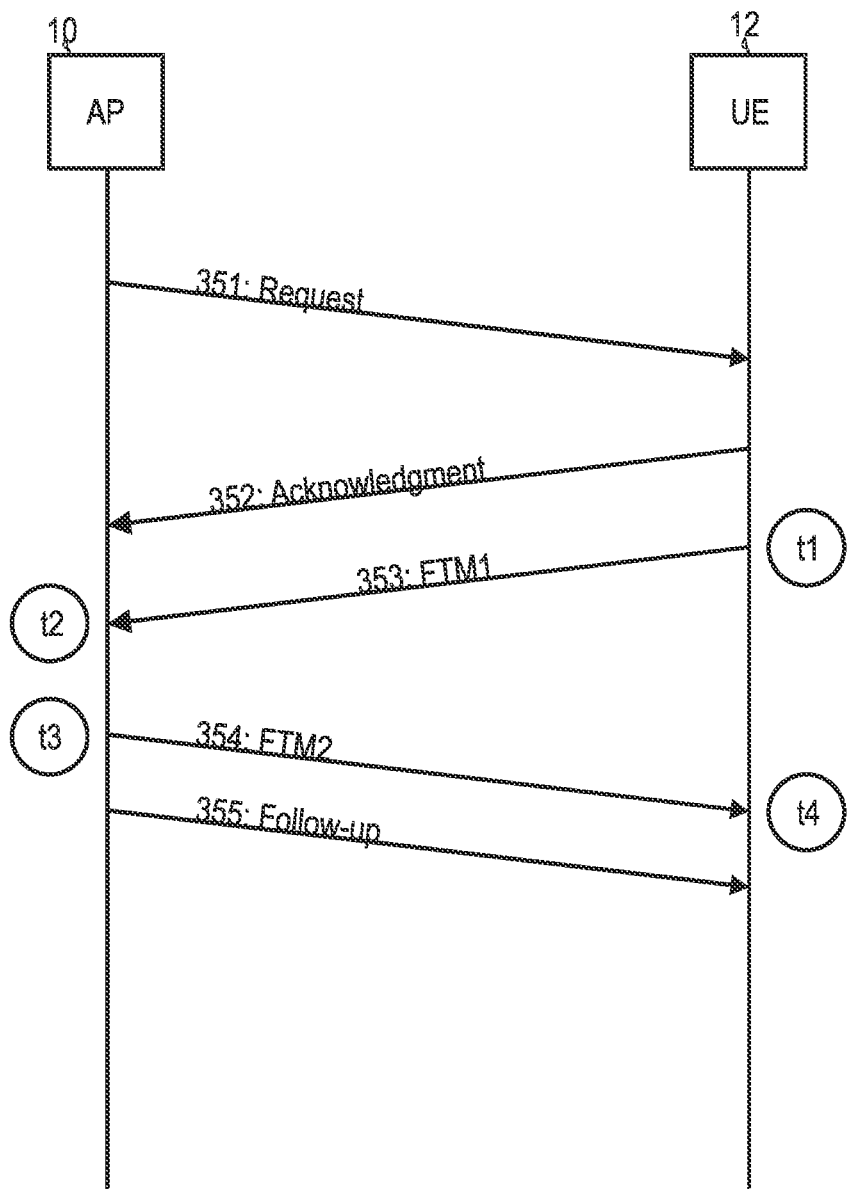
FIG. 3B schematically illustrates a Fine Time Measurement positioning technique according to various embodiments.

FIG. 3B illustrates aspects of the FTM positioning technique. Since IEEE 802.11-2012, the use of so-called timing measurement packets, sometimes also referred to as frames, is known. A UE 12 may transmit timing measurement packets addressed to a peer UE or the AP 10. Along with this, a higher-layer protocol for synchronizing the local clock time between various nodes of the communications network has been standardized as well.

A particular application of timing measurement packets is the FTM technique. The FTM technique is a three-stage procedure including negotiation, FTM implementation, and reporting the time-stamp of the previous FTM exchange. First, a handshake 351, 352 between two devices is executed, here between the AP 10 and the UE 12. Then, a FTM-1 packet 353 is then sent by the UE 12 and received by the AP 10; FTM-1 has a Time of Departure (ToD) t1 and ToA (Time of Arrival) t2; t1 and t2 are recorded. Next, a FTM-2 packet 354 is sent from by the AP 10 and received by the UE 12; the corresponding ToD t3 and ToA t4 are recorded. A follow-up is packet is utilized to carry data such as an indicator of t3 to STA2. Control signaling 355 indicating t2 and t3 is implemented. The round-trip time can be calculated by ((t4−t3)+(t2−t1))/2. The clock offset between two devices can be compensated automatically. A value for the offset can be calculated by ((t4−t3)−(t2−t1))/2.

As can be seen, the average travel times of the packets 353, 354 is taken into account. The FTM technique enables to determine the average travel time–and thereby the round tip time–at an accuracy of on the order of 1 nanosecond, preferably on the order of 100 picoseconds. In some scenarios, the FTM technique enables to determine the average travel time–and thereby the round trip time–at an accuracy of better than 1 nanosecond, preferably better than 100 picoseconds. This substantially improves the limitation of the accuracy of the corresponding positioning technique.

Reference Positioning Technique: Inertial Navigation System (INS) Positioning

INS-based positioning relies on motion sensors and rotation sensors to track the absolute location by monitoring the acceleration. E.g., three rate gyroscopes can be employed, together with three accelerometers as the INS. Optionally, the altitude may be obtained by a barometer.

Due to the differential nature of such a positioning technique, an initial alignment may be required (calibration). The location of the UE 12 may then be determined based on an output of the INS.

Reference Positioning Technique: Fixed Reference Locations

The UE 12 can be assigned a set of determined reference locations in a map, for example, points of a coordinate grid. Then, the UE 12 can be positioned manually. Here, determining of the location of the UE 12 includes positioning the UE 12 at the reference location which is known. Time tags or a numbering scheme may be possible embodiments for keeping track of the various reference locations.

§

Above, various reference positioning techniques have been illustrated that may be combined alone or in combination with each other to determine the location of the UE 12 when populating the fingerprint database.

Figure 4:
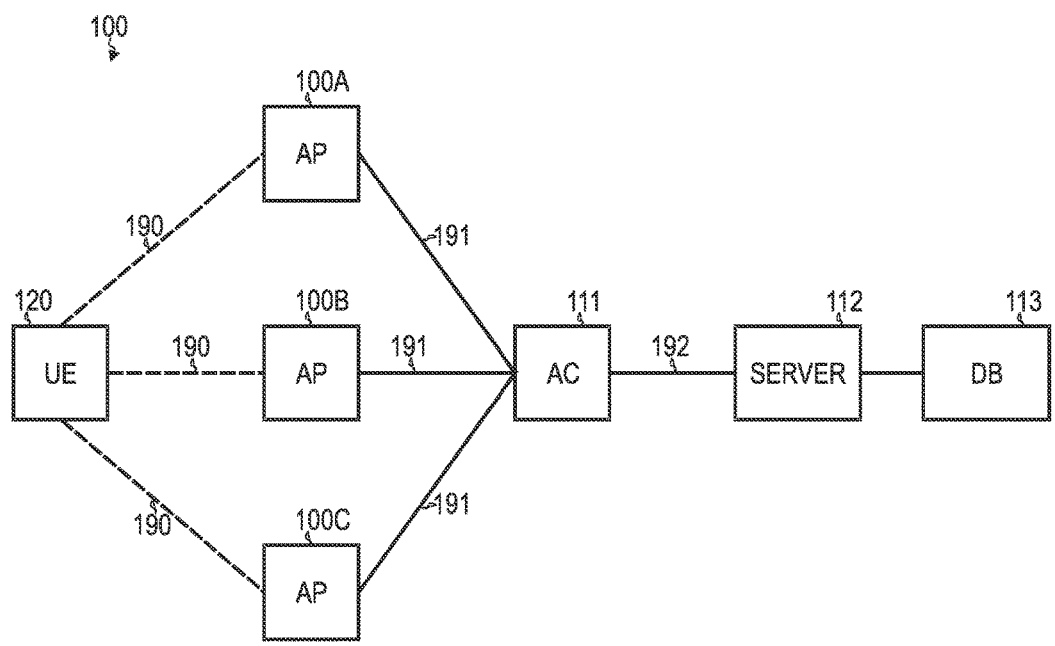
FIG. 4 schematically illustrates an architecture of a network used for populating a fingerprint database for fingerprint positioning according to various embodiments.

FIG. 4 illustrates aspects of the architecture employed for populating the fingerprint database. A UE 120 is connected via a radio link 190 of a communications network 100 with three APs 100A, 100B, 100C. In other scenarios, the UE 120 can be connected with only a single AP or to APs or more than three APs. For IEEE WLAN RAT, the UE 120 is sometimes referred to as a station (STA).

In the scenario of FIG. 4, the access functionality is split between the APs 100A, 100B, 100C and a control node 111. The APs 100A, 100B, 100C are connected with the control node 111 via a backhaul 191; in the scenario FIG. 4, the backhaul 191 is implemented as a fixed-wire connection. Sometimes, the APs 100A, 100B, 100C may fixedly integrate functionality of the control node 111 into a single entity. Sometimes, the control node 111 may be referred to as access controller. The splitting of the logic between the Aps 100A, 100B, 100C is not germane for the various scenarios disclosed herein.

The control node 111, in turn, is connected via a further backhaul 192 with the fingerprint repository node 112. Sometimes, the fingerprint repository node 112 and the control node 111 and/or the APs 100A, 100B, 100C may be integrated into a single entity. The fingerprint repository node is sometimes also referred to as positioning server. The fingerprint repository node 112 accesses and maintains a database 113 (fingerprint database). The fingerprint database 113 comprises entries which indicate the fingerprints. The entries build up the fingerprint map.

All of the various entities 100A-100C, 111, 112, 120 may participate in populating the fingerprint database 113. Generally, the distribution of logic in between the various entities 100A-100C, 111, 112, 120 may flexibly vary from scenario to scenario. The one or more APs 100A, 100B, 100C are utilized to exchange packets (communicate) with the UE 120 for populating the fingerprint database 113. This facilitates implementation of different distributions of logics. The packets may contain, e.g., time stamps, path loss information, location reports, other positioning-related information, etc. The control node 111 may deliver configuration information to the APs 100A, 100B, 100C and/or the UE 120 to control their behaviors when populating the fingerprint database 113. The measurement results collected at the UE 120 and/or the APs 100A, 100B, 100C may be reported to the control node 111. The measurement results may include the measured quantities or the processed measured quantities, i.e., the location-specific properties of the radio link 190. Then the control node 111 may, in some scenarios, process the measurement results, e.g., fusing the processed measured quantities, and report the processed data to the fingerprint location repository 112. In other configurations, the UE 120 and/or the APs 100A, 100B, 100C may also be able to process and/or report the collected data directly to the fingerprint repository node 112. The fingerprint repository node 112 may calculate the location of the UE 120 based on the reported data and other available information in the database 113.

Figure 5:
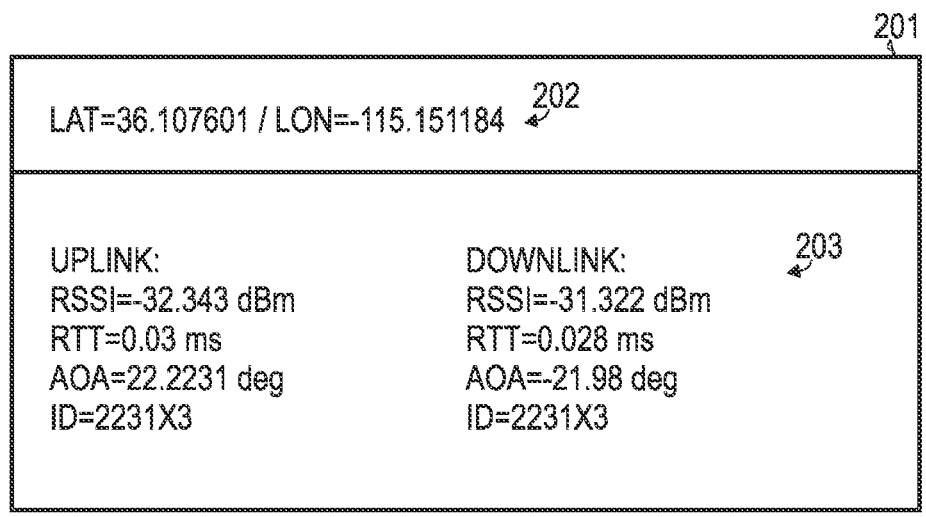
FIG. 5 schematically illustrates a fingerprint associated with a given location for storing in the fingerprint database.

FIG. 5 illustrates aspects of fingerprint 201. E.g., the fingerprint 201 of FIG. 5 could be stored in the database 113. The fingerprint 201 is associated with a location 202 within the communications network 100. The location 202 is determined by one or more reference positioning techniques as explained above. In the scenario of FIG. 5, the fingerprint 201 includes a field indicating latitude and longitude in WGS84 format. Other examples include a polygon with corners in WGS84 coordinates that define a small region where the fingerprint is valid.

The fingerprint 201 further includes a plurality of location-specific DL properties 203 and a plurality of location-specific UL properties which are fused together. The location-specific DL and UL properties 203 are derived from measured DL quantities and measured UL quantities of the radio link 190 at the respective location, respectively.

The type and number of location-specific DL and/or UL properties 203 is not germane for the functioning of the fingerprint positioning technique. Generally, a larger number and a higher accuracy of the location-specific DL and/or UL properties 203 allows for a higher accuracy when determining the location of a UE based on the fingerprint positioning technique. The number and accuracy of the location-specific DL properties 203 and/or location-specific UL properties 203 should be sufficiently large to avoid ambiguities between multiple locations; each fingerprint 201 should be unique so that the location can be unambiguously determined.

Hereinafter, various examples are given for possible location-specific DL properties 203 and/or location-specific UL properties 203 that can be used for populating the fingerprint database 113. Each of these examples can be used as DL only or UL only or a combination of DL and UL.

Location-Specific Property of the Radio Link: Signal Strength

E.g., a signal strength of a signal received by a transceiver via the radio link may be considered as a location-specific UL and/or DL property. E.g., the Received Signal Strength Indicator (RSSI) may be taken into account. Sometimes, the RSSI is also expressed in terms of pathloss. The RSSI may correspond to a measurement of the distance-dependent signal strength. In principle, the distance 16, 16A-16C between the UE 120 and the APs 100A, 100B, 100C could be reflected by RSSI based on certain attenuation model. However, the RSSI is typically sensitive to the radio environment and the actual behavior of the RSSI could be greatly different from the model. A further option is to rely on the Received Channel Power Indicator (RCPI). RCPI is replacing RSSI in the 802.11 WLAN protocol. The RCPI measures the received radio-frequency power in a selected channel of the radio link 190 over the preamble and the entire received packet.

Location-Specific Property of the Radio Link: RTT

The RTT of at least one packet communicated via the radio link 190 can be taken into account. In particular, FTM-based RTT measurement can be taken into account.

Location-Specific Property of the Radio Link: WLAN FTM

The FTM can be considered. Here, the average travel time of a plurality of packets 353, 354 communicated via the radio link 190 can be taken into account.

Location-Specific Property of the Radio Link: AoA

The AoA of a signal received by the transceiver via the radio link 190 can be taken into account.

Location-Specific Property of the Radio Link: TOA or TDOA

A TOA and/or TDOA measurement can be taken into account. Here, the travel time of a single packet communicated via the radio link 190 can be considered in determining the TOA and/or TDOA.

Location-Specific Property of the Radio Link: Cell ID

The cell identification of the AP serving a given cell can be taken into account.

Location-Specific Property of the Radio Link: Radio Connection Information

Certain properties of the radio link 190 can be taken into account. E.g., the radio access bearer (RAB) can be location-specific and may be used for fingerprinting.

Above, various examples have been given for location-specific UL properties 203 and/or location-specific DL properties 203 of the radio link 190 that can be taken into account for fusing into the fingerprint 201. Hereinafter, various details are explained with respect to the signaling and the fingerprint processing that allow to populate the fingerprint database 113.

Figure 6:
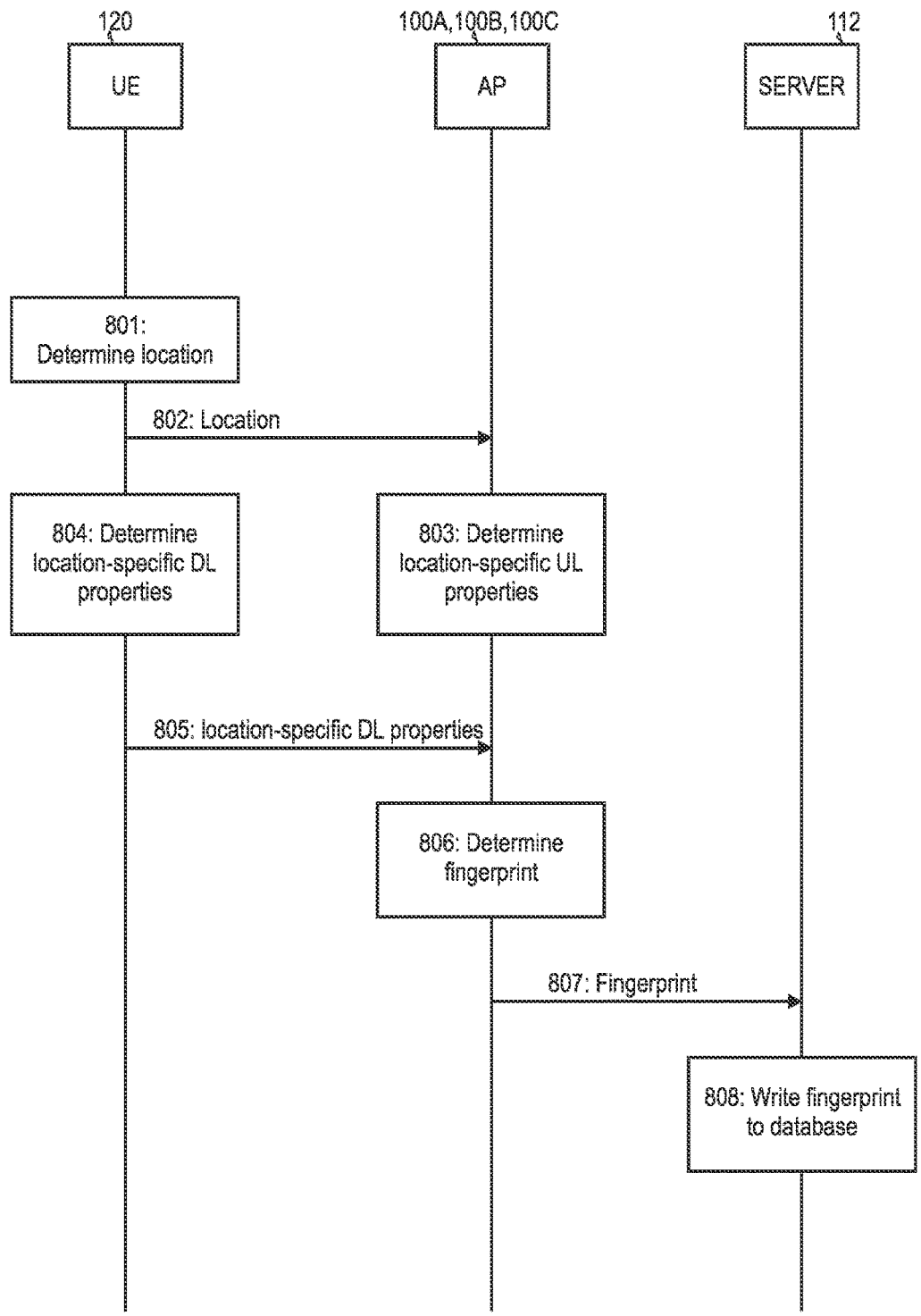
FIG. 6 is a signaling diagram of techniques of populating the fingerprint database according to various embodiments.

FIG. 6 illustrates aspects of populating a fingerprint database, wherein the logic for determining the fingerprint 201 resides at the at least one AP 100A, 100B, 100C.

In some scenarios, to trigger the procedure, the UE 120 may receive a request from the at least one AP 100A, 100B, 100C to start reference measurements (not shown in FIG. 6). Such a request may include an initial alignment in position and direction.

In the "walk around" mode, the UE 120 walk through the target area and collects location samples employing one or more reference positioning techniques. In the "deterministic" mode, the test UE is positioned manually according to the given reference map.

In detail, at 801, the UE 120 determines its location in the cellular network 100. For determining the location, one or more reference positioning techniques may be employed, e.g.: A-GPS; AoA; TOA; TDOA; FTM; and/or INS as explained above. In other scenarios, it is possible that for determining the location of the UE 120 at 801, the UE 120 is manually positioned at a predefined location. For the various scenarios disclosed herein, one or more of the various reference positioning techniques may be flexibly combined.

Next, a location report 802 indicating the determined location of the UE 120 is sent from the UE 122 to at least one of the APs 100A, 100B, 100C; e.g., the location may be indicated by coordinates in WGS84. By means of the location report 802, the at least one AP 100A, 100B, 100C can determine the location of the UE 120 as well; this applies generally to the various scenarios disclosed herein. A time and/or position synchronization between the UE 120 and the at least one AP 100A, 100B, 100C is possible. For this, time stamp information may be exchanged.

At 803, 804, both, the at least one AP 100A, 100B, 100C, as well as the UE 120 determine location-specific properties of the radio link 190. In particular, the UE 120 determines DL location-specific properties 203 of the radio link 190; while the at least one AP 100A, 100B, 100C determines UL location-specific properties 203 of the radio link 190.

Various kinds of location-specific properties 203 can be determined at 803, 804, e.g.: cell ID; AoA; TOA; TDOA; RSSI; RCPI; RTT; and/or RAB connection information. Some of these location-specific properties may be specific for UL or DL while some may be the same for UL and DL. All this applies generally to the various scenarios disclosed herein.

As can be seen, the location-specific DL properties 203 at 804 and the location-specific UL properties 203 at 803 are determined at approximately the same moment in time. E.g., an accuracy of synchronizing the determining of the DL location-specific properties 203 and the UL location-specific properties 203 may be in the range of milliseconds, 100 milliseconds, or seconds in the various scenarios disclosed herein–such that it may be assumed that the UE 120 remains substantially static until, both, the location-specific UL properties 203 and the location-specific DL properties 203 have been determined at 803, 804. Time synchronization may be achieved by exchanging time stamp information, e.g., as part of the location report 802.

Next, the UE 120 sends data 805 which is indicative of the DL location-specific properties 203 of 804. The data 805 received by the at least one AP 100A, 100B, 100C is indicative of the plurality of location-specific DL properties 203 which are associated with the location of the UE 120 as determined in 801. In the various scenarios described herein, such an association may be implicitly included, e.g., in connection with the preceding location report 802; other scenarios, such an association may be explicitly included, e.g., by including a respective location report in the data 805.

E.g., where the data 805 is sent employing the WLAN RAT, a dedicated frame that carries fingerprint-related measurements/information between UE 120 and the at least one AP 100A, 100B, 100C can be defined in the standard, as part of, for example, IEEE 802.11k amendment on radio resource measurement. The signaling may be employing a frame request/report pair having various information elements (measurements) corresponding to the location-specific properties 203.

E.g., where the data 805 is sent employing the 5G Rat, the Radio Resource Control (RRC) channel may be employed.

The data 805 is received by the at least one AP 100A, 100B, 100C; the at least one AP 100A, 100B, 100C then determines the fingerprint 201, 806. For this, the at least one AP 100A, 100B, 100C fuses the plurality of location-specific DL properties and the plurality of location-specific UL properties to obtain the fingerprint 201. In the various scenarios described herein, fusing the fingerprint may include specific algorithms to improve the accuracy of the fingerprints 201 thus determined.

While in the scenario of FIG. 6 the location report 802 is communicated before the location-specific DL properties 203 and the location-specific UL properties 203 are determined at 803, 804, generally, in the various scenarios disclosed herein it is also possible that the location report 802 is communicated afterwards; in some scenarios it's even possible that the location report 802 is included in the data 805 indicating the location-specific DL properties 203. In such a scenario, a time synchronization message including time stamp information may be sent in order to achieve time synchronization and to ensure that the location-specific DL properties 203 and the location-specific properties 203 are determined at approximately the same moment in time.

Data 807 indicative of the fingerprint is then sent to the fingerprint repository node 112. The fingerprint repository node 112 receives the data 807 and writes the received data 807 indicative of the location-specific fingerprint 201 to the fingerprint database 113, 808.

In WLAN, the communication between AP 120 and fingerprint repository node 120, as well as the UE 120 and the fingerprint repository node 120 is usually enabled by proprietary protocols. There are several standard ones, e.g., the control and provisioning of wireless access points (CAPWAP) protocol, but they are usually modified by each vendor. In such protocols, signaling may be required to carry the following: (Processed) fingerprints, e.g., including a set of coordinates and corresponding measurement data; and/or cell ID (AP location).

For 3GPP 5G, signaling from the at least one AP 100A, 100B, 100C to the fingerprint repository node 112 is through the user plane of the core network may include the following: (Processed) fingerprints, e.g., including a set of coordinates and corresponding measurement data; Cell ID; and coordinates of the respective at least one AP 100A, 100B, 100C.

In various scenarios disclosed herein, the AP 100A, 100B, 100C may also send fingerprints 201 and available reference measurements, e.g., obtained at UE 120 and at the AP 100A, 100B, 100C, together to the fingerprint repository node 112 for further processing. This requires additional signaling of available reference measurements. Details will be described hereinafter.

Determining the fingerprint 201 of the radio link 190 at the at least one AP 100A, 100B, 100C —as illustrated in the scenario of FIG. 6–allows to reduce computational load imposed on the fingerprint repository node 112. Further, control signaling between the UE 120 and the at least one AP 100A, 100B, 100C may be implemented straightforwardly.

Figure 7:
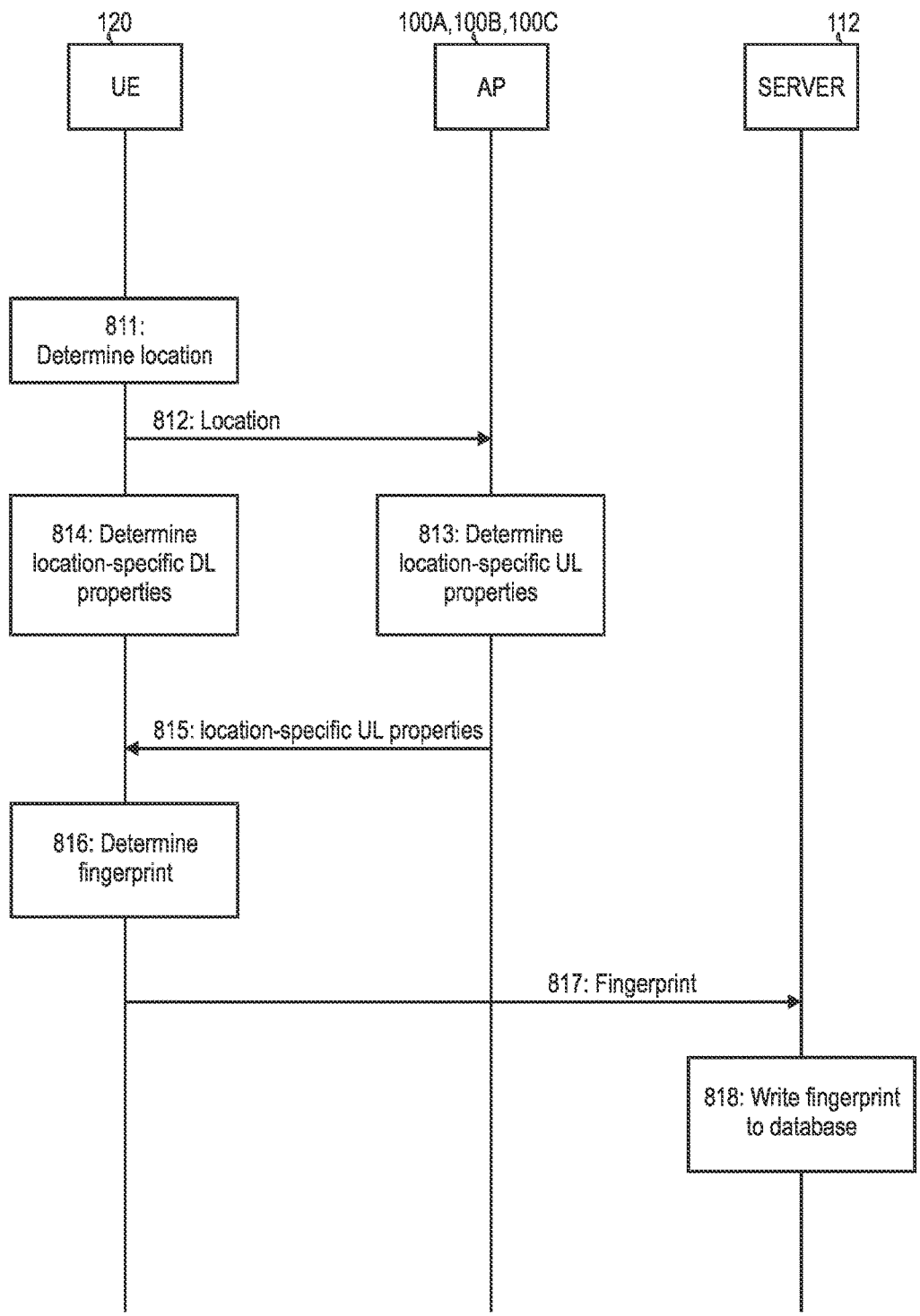
FIG. 7 is a signaling diagram of techniques of populating the fingerprint database according to various embodiments.

FIG. 7 illustrates aspects of populating a fingerprint database, wherein the logic for determining the fingerprint 201 resides at the UE 120.

811-814 generally correspond to 801-804.

Next, the at least one AP 100A, 100B, 100C sends data 815 which is indicative of the location-specific UL properties 203 of the radio link 190 as determined at 813. The UE 120 receives the data 815.

Next, the UE 120 determines the fingerprint 201 of the radio link 190 associated with the determined location of 811. For this, the UE 120 fuses the plurality of location-specific UL properties 203 and the plurality of location-specific DL properties 203 to obtain the location-specific fingerprint 201 of the radio link 190 which is associated with the determined location of the UE 120.

Next, the UE 120 sends data 817 indicative of the determined fingerprint 201 to the fingerprint repository node 112 which receives the data 817 and writes the data 817 to the fingerprint database 113, 818.

Determining the fingerprint 201 of the radio link 190 at the UE 120—as illustrated in the scenario of FIG. 7—allows to reduce computational load imposed on the fingerprint repository node 112. Further, control signaling between the UE 120 and the at least one AP 100A, 100B, 100C may be implemented straightforwardly.

Determining the location-specific properties of the radio link 190 at 803, 804, 813, 814 typically includes retrieving, from a transceiver, a plurality of measured UL/DL quantities of a signal communicated on the radio link 190 and processing the plurality of measured UL/DL quantities to obtain the plurality of location-specific UL/DL properties 203. In the scenario of FIGS. 6 and 7, such early-stage processing of raw measurement data is executed locally by the UE 120 at and by the at least one AP 100A, 100B, 100C, respectively. In the various scenarios disclosed herein, it is also conceivable that the data 805, 815 at least partly does not indicate the fully processed location-specific UL/DL properties 203, but rather comprises the measured UL/DL quantities. In such a scenario, the processing may be part of determining the fingerprint at 806, 816. The raw data may be processed at remote devices 120, 100A, 100B, 100C.

Figure 8:
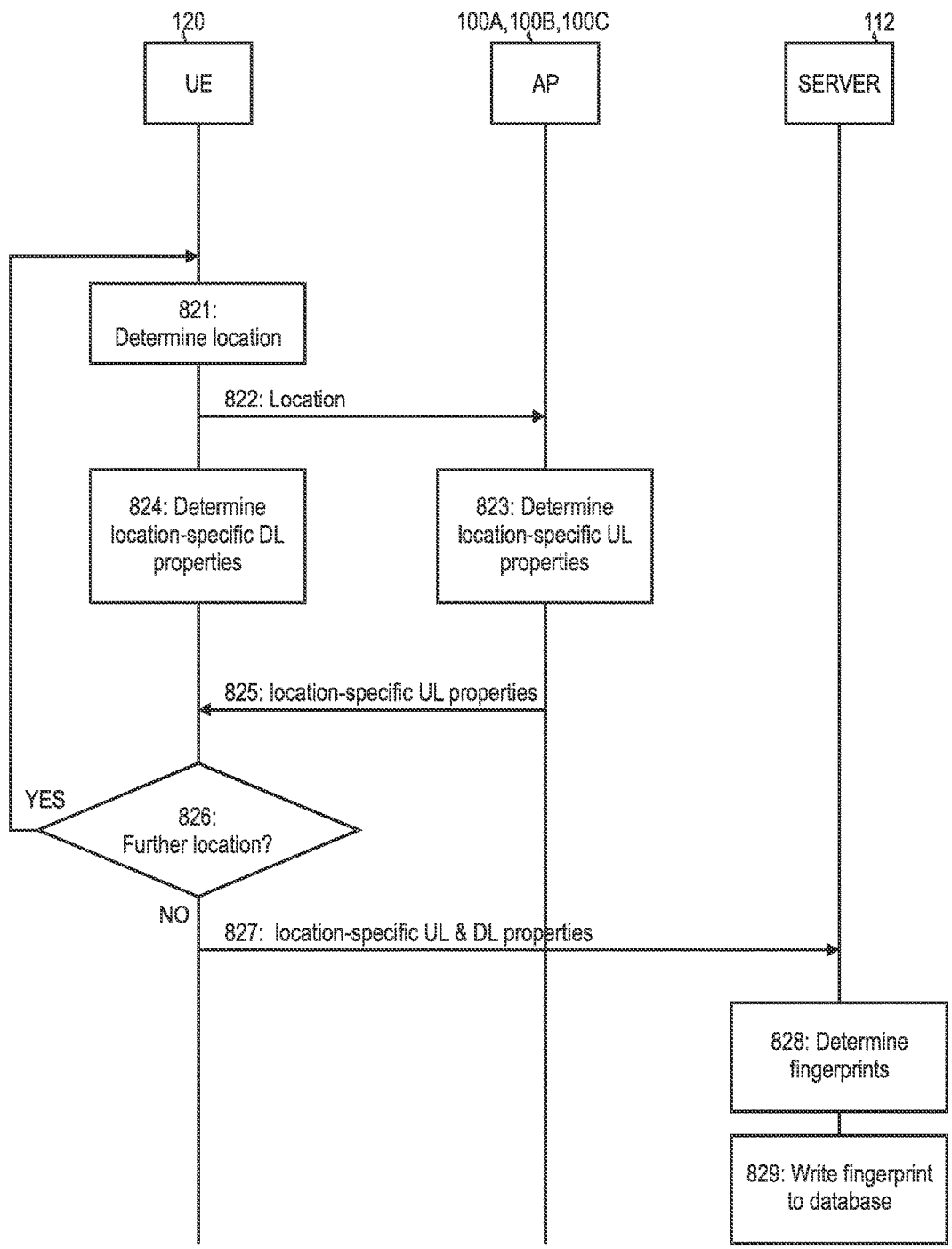
FIG. 8 is a signaling diagram of techniques of populating the fingerprint database according to various embodiments.

FIG. 8 illustrates aspects of populating a fingerprint database, wherein the logic for determining the fingerprint 201 resides at the fingerprint repository node 112.

Here, the fingerprints 201 are determined at the fingerprint repository node 112 based on the reference measurements performed and reported from the UE 120 and the at least one AP 100A, 100B, 100C. The measurements performed at the at least one AP 100A, 100B, 100C are first transmitted to and are processed at the UE 120.

First, the UE 120 may receive a request from the fingerprint repository node 120 to start reference measurements with an initial alignment in position and direction (not shown in FIG. 8). In the "walk around" mode, the UE 120 walks through the target area and collects location samples using a reference positioning technique. In the "deterministic" mode, the UE 120 is positioned manually according to the given reference map.

821-825 generally correspond to 811-815.

The UE 120 collects the measurements from the at least one AP 100A, 100B, 100C and then reports all available measurements including those measured at the at least one AP 100A, 100B, 100C to the fingerprint repository node 112.

At 826, the UE 120 checks whether location-specific properties 203 of the radio link 190 need to be collected for a further location in the communications network 100. If this is the case, 821-825 are executed anew. Otherwise, the UE sends data 827 indicative of the location-specific UL properties 203 and the location-specific DL properties 203 collected for the various locations for which iterations of 821-825 have been executed.

In this scenario, the UE 120 may receive the reference measurements from the at least one AP 100A, 100B, 100C and then send the entire set of reference measurements together with the corresponding UE 120 location coordinates to the fingerprint repository node 112 for fingerprint processing. The at least one AP 100A, 100B, 100C is transparent in this procedure. Here, the signaling from the at least one AP 100A, 100B, 100C to the UE 120 may be through dedicated frame request/report pair for IEEE WLAN-based systems and DL RRC for the 3GPP LTE/5G-based systems.

The data 827 is received by the fingerprint repository node 112 which determines a plurality of fingerprints 201 of the radio link 190, 828. The fingerprint repository node 112 processes the collected measurements. The fingerprint repository node 112 stores the location coordinates and corresponding processed measurements as fingerprints in the fingerprint database 113. The processing procedure may involve specific algorithms to improve the accuracy of the fingerprints. In particular, the fingerprint repository node 112 determines the respective fingerprint for every location for which an iteration of 821-825 has been executed and location-specific UL properties 203 and location-specific DL properties 203 have been collected. Determining the fingerprint 201 for a given location comprises: fusing the respective location-specific UL properties 203 and the respective location-specific DL properties 203 to obtain the fingerprint 201 associated with the respective location. The fingerprint repository node 112 then writes the determined fingerprints 201 to the fingerprint database 113, 829.

In the various scenarios disclosed herein, the fingerprint repository node 112 may also send the fingerprint data to the at least one AP 100A, 100B, 100C and store a copy there for future use. Signaling is required of processed fingerprint data from the fingerprint repository node 112 to the at least one AP 100A, 100B, 100C (not shown in FIG. 8).

Determining the fingerprints 201 of the radio link 190 at the fingerprint repository node 112—as illustrated in the scenario of FIG. 8—allows to reduce a computational load imposed on the at least one AP 100A, 100B, 100C. By collecting multiple location-specific UL/DL properties 203 for various locations, control signaling load to the fingerprint repository node 112 may be reduced.

While in the scenario of FIG. 8 the UE 120 collects all measurements, in a further scenario the at least one AP 100A, 100B, 100C collects the measurements from the UE 120 and then reports the all available measurements including those measured at the at least one AP 100A, 100B, 100C to the fingerprint repository node 112. Alternatively, the UE 120 and the at least one AP 100A, 100B, 100C may separately report the reference measurements to the fingerprint repository node 112.

Figure 9:
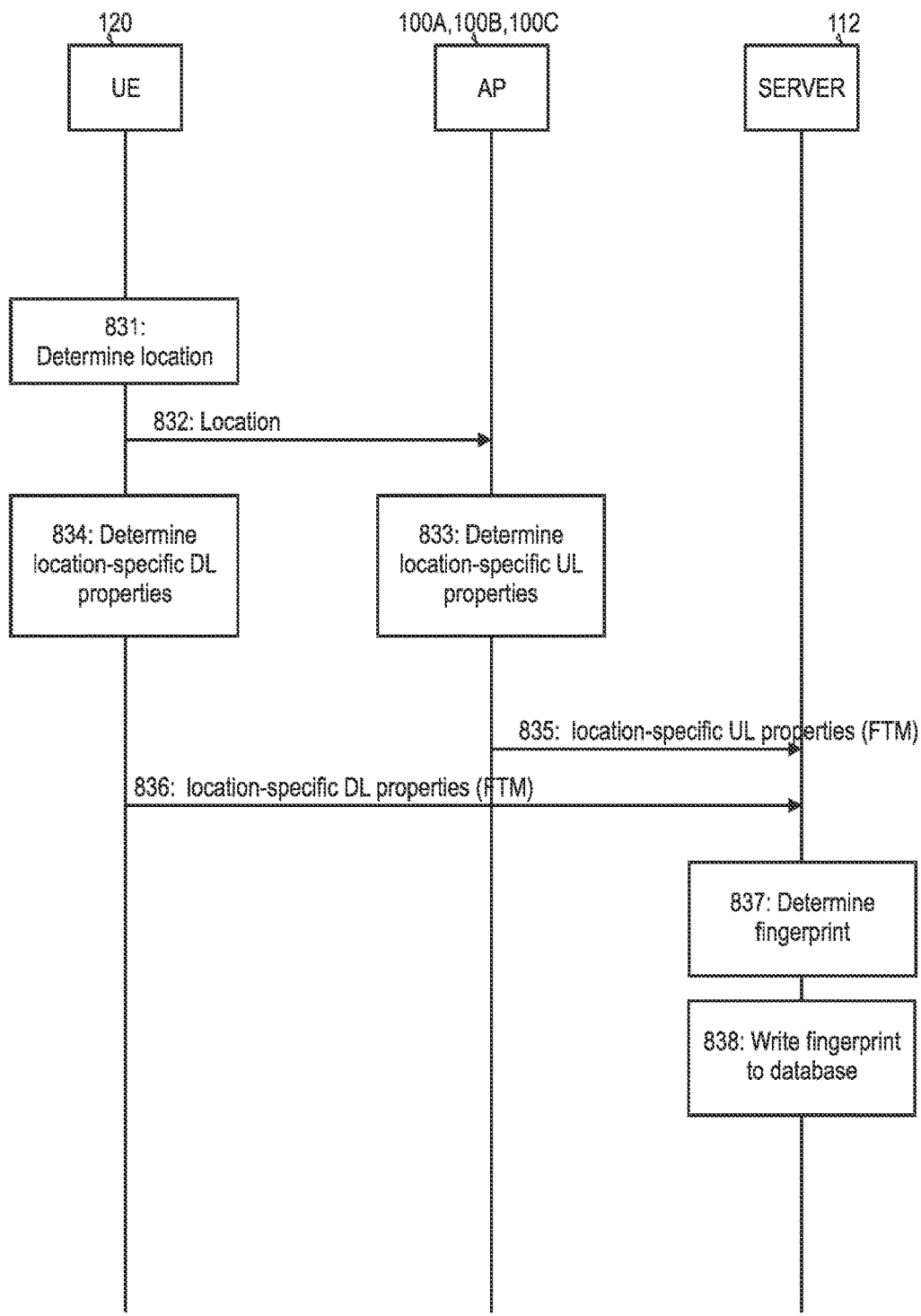
FIG. 9 is a signaling diagram of techniques of populating the fingerprint database according to various embodiments.

FIG. 9 illustrates aspects of populating a fingerprint database, wherein the logic for determining the fingerprint 201 resides at the fingerprint repository node 112.

831-833 generally correspond to 821-823.

Next, the at least one AP 100A, 100B, 100C sends data 835 indicative of the location-specific UL properties 203 to the fingerprint repository node 112. In particular, the plurality of location-specific UL properties 203 as indicated by the data 835 comprise an average travel time of a plurality of packets 353, 354 communicated via the radio link 190. E.g., the location-specific properties 203 may comprise FTM-based data.

The UE 120 sends data 836 indicative of the location-specific DL properties 203 to the fingerprint repository node 112. In particular, the location-specific DL properties 203 as indicated by the data 836 comprise an average travel time of a plurality of packets 353, 354 communicated via the radio link 190. E.g., the location-specific properties 203 may comprise FTM-based data.

While in the scenario of FIG. 9 reporting of location-specific UL properties via the data 835, as well as of location-specific DL properties via the data 836 is illustrated, in other scenarios, either only location-specific UL properties 203 or location-specific DL properties 203 can be reported.

The fingerprint repository node 112 receives the data 835, 836 indicative of the location-specific UL properties 203 and the location-specific DL properties 203, respectively.

837, 838 generally correspond to 828, 829.

Including the FTM-based data in the location-specific properties 203 allows for accurate positioning employing the fingerprint position and techniques. In particular, the FTM-based data can be indicative of the location is determined at 803 at a high accuracy. Employing the FTM-technique for populating the fingerprint database 113 allows to increase an accuracy for positioning.

In the scenarios illustrated herein, the RAT employed for the control signaling between the various entities 100A, 100B, 100C, 112, 120 when populating the fingerprint database 113 is not germane for the functioning of the techniques of populating the fingerprint database 113. In some scenarios, it is possible that the control signaling between the various entities 100A, 100B, 100C employs the radio link 190 for which the location-specific UL/DL properties 203 are determined and for which the fingerprint database 113 is populated. In other scenarios, other RATs may be employed.

In the scenario rated above, the fingerprint 201 is fused based on, both, location-specific UL properties 203, as well as location-specific DL properties 203. In the various scenarios disclosed herein, it is possible that the fingerprint 201 is fused based on either the location-specific UL properties 203 or the location-specific DL properties 203, only.

Figure 10:
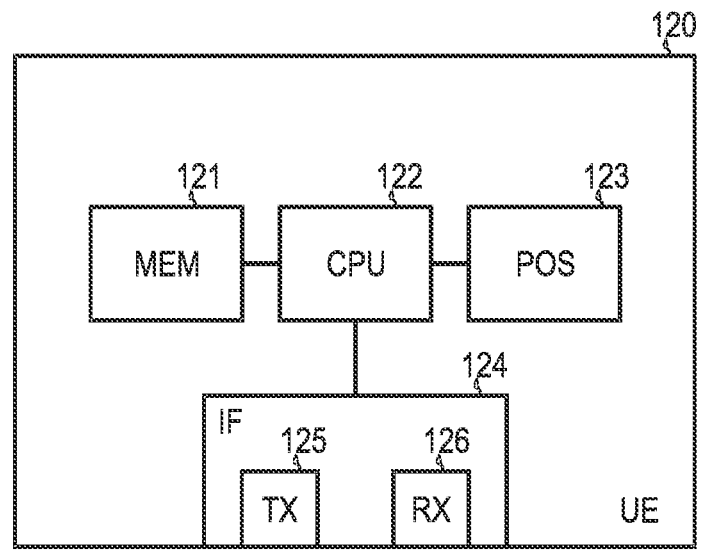
FIG. 10 schematically illustrates a mobile device configured to determine a plurality of location-specific properties of the radio link as part of populating the fingerprint database according to various embodiments.

FIG. 10 illustrates aspects of the UE 120. The UE 120 comprises an interface 124 which comprises a receiver 126 and the transmitter 125 (transceiver) for transceiving on the radio link 190. The interface 124 is further configured to communicate with the at least one AP 180 100A, 100B,

100C and/or the fingerprint repository node 112; such a communication may be implemented via the radio link 190 or a different RAT. The interface 124 is coupled with a processor 122. E.g., the processor 122 may be a multi-core processor. The processor 122 is coupled with a memory 121 and with a positioning unit 123. E.g., the positioning unit 123 may comprise an IMS. The memory 121 may store control data that may be executed by the processor 122. Executing the control data by the processor 122 may cause the processor 122 executing techniques relating to the populating of the fingerprint database 113 as illustrated herein. In particular, executing the control data may cause the processor 122 to obtain data indicative of the location of the UE 120 from the positioning unit 123 and thus determine the location of the UE 120. Further, executing the control data by the processor 122 may cause the processor 122 to determine location-specific DL properties 203. Further, executing the control data by the processor 122 may cause the processor 122 to determine a fingerprint 201 by fusing location-specific UL properties 203 and/or location-specific DL properties 203. Further, executing the control data by the processor 122 may cause the processor 122 to communicate with the at least one AP 100A, 100B, 100C and/or the fingerprint repository node 112 via the interface 124.

Figure 11:
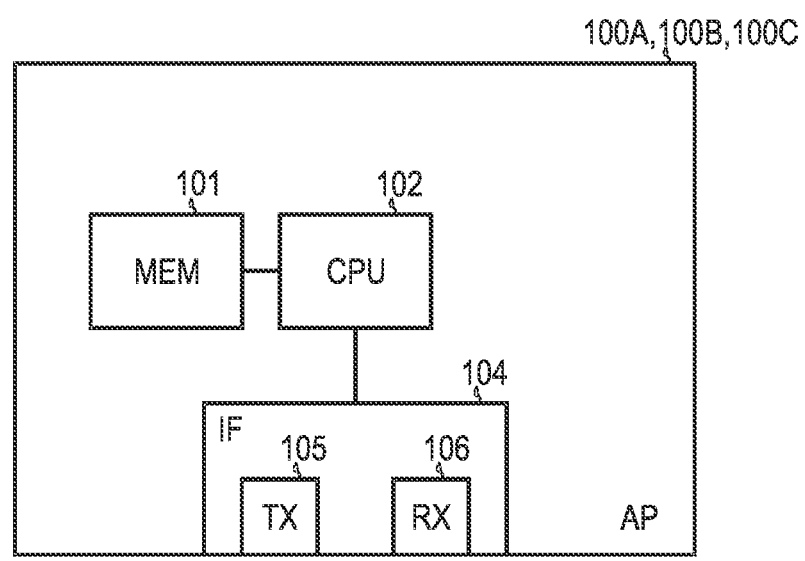
FIG. 11 schematically illustrates an access point node configured to determine a plurality of location-specific properties of the radio link as part of populating the fingerprint database according to various embodiments.

FIG. 11 illustrates aspects of the APs 100A, 100B, 100C. The APs 100A, 100B, 100C comprise an interface 104 which comprises a receiver 106 and a transmitter 105 for transceiving on the radio link 190. The interface 104 is further configured to communicate with the UE 120 and/or the fingerprint repository node 112; such a communication may be implemented via the radio link 190 or a different RAT. The interface 104 is coupled with the processor 102. E.g., the processor 102 may be a multi-core processor. The processor 102 is coupled with a memory 101. The memory 101 may store control data that may be executed by the processor 102. Executing the control data by the processor 102 may cause the processor 102 executing techniques relating to the populating of the fingerprint database 113 as illustrated herein. In particular, executing the control data may cause the processor 102 to obtain data indicative of the location of the UE 120, e.g., via the interface 104. Further, executing the control data by the processor 102 may cause the processor 102 to determine location-specific UL properties 203 of the radio link 190. Further, executing the control data by the processor 102 may cause the processor 102 to determine a fingerprint 201 by fusing location-specific UL properties 203 and/or location-specific DL properties 203. Further, executing the control data by the processor 102 may cause the processor 102 to communicate with the UE 120 and/or the fingerprint repository node 112 via the interface 104.

Figure 12:
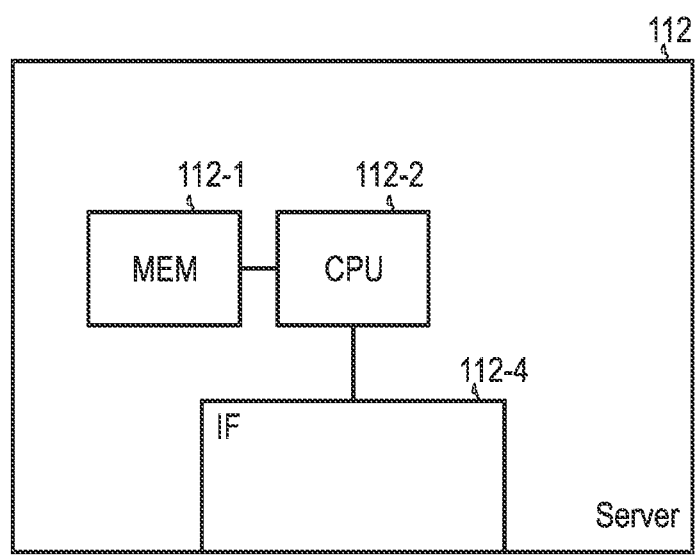
FIG. 12 schematically illustrates the fingerprint repository node.

FIG. 12 illustrates aspects of the fingerprint repository node 112. The fingerprint repository node 112 comprises an interface 112-4 which is configured to communicate with the UE 120 and/or the at least one AP 100A, 100B, 100C; such a communication may be implemented via the radio link 190 or a different RAT. The interface 112-4 is coupled with a processor 112-2. E.g. the processor 112-2 may be a multi-core processor. The processor 112-2 is coupled with a memory 112-1. The memory 112-1 may store control data that may be executed by the processor 112-2. Executing the control data by the processor 112-2 may cause the processor 112-2 executing techniques relating to the populating of the fingerprint database 113 as illustrated herein. In particular, executing the control data may cause the processor 100 to obtain data indicative of a plurality of location-specific UL properties 203 and/or a plurality of location-specific DL properties 203 of the radio link. Further, executing the control data by the processor 112-2 may cause the processor 112-2 to determine a fingerprint 201 by fusing location-specific UL properties 203 and/or location-specific DL properties 203. Further, executing the control data by the processor 112-2 may cause the processor 112-2 to communicate with the UE 120 and/or the at least one AP 100A, 100B, 100C via the interface 112-4.

Figure 13:
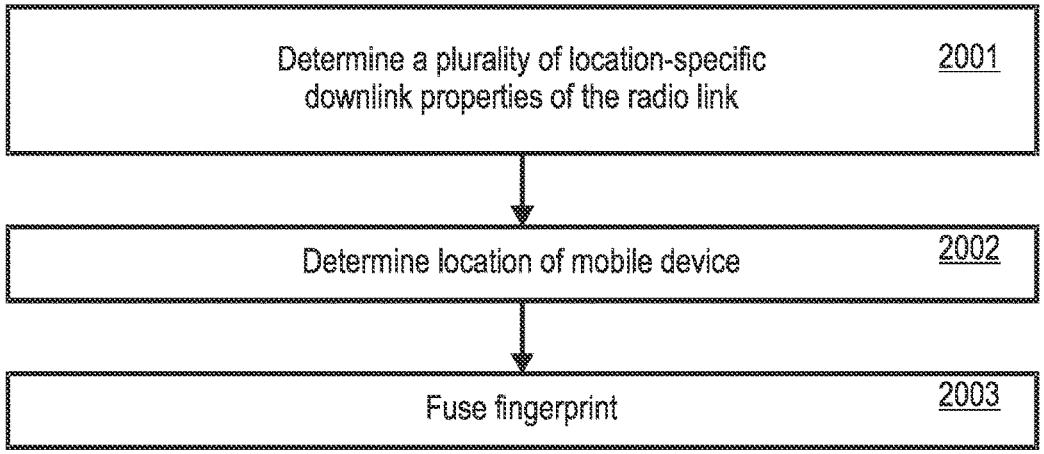
FIG. 13 is a flowchart of a method according to various embodiments.

FIG. 13 is a flowchart of a method according to various embodiments which may be executed by the UE 120 according to various embodiments.

At 2001, a plurality of location-specific DL properties 203 of the radio link 190 are determined. E.g., FTM-based data may be determined at 2001. The FTM-based data may include the average travel time of a plurality of packets communicated via the radio link 190.

At 2002, the location of the UE 120 is determined. One or more reference positioning techniques as disclosed herein may be employed.

At 2003, the fingerprint 2001 is fused based on the plurality of location-specific DL properties of the radio link 190 as determined in 2001. Optionally, at 2003, a plurality of location-specific UL properties of the radio link 190 may also be taken into account when fusing the fingerprint 201; e.g., it may be possible that respective data is received from the at least one AP 100A, 100B, 100C that is indicative of the plurality of location-specific UL properties 203 of the radio link 190 (not shown in FIG. 13).s Generally, in the various scenarios as illustrated herein, the fingerprint 201 should be fused based on location-specific properties 203 that are associated with one and the same location of the UE 120. For this, a time and location synchronization between the determining of the plurality of location-specific DL properties 203 of the radio link 190 by the UE 120 and the determining of the plurality of location-specific UL properties 203 of the radio link 190 by the at least one AP 100A, 100B, 100C may be implemented. Time stamp information may be communicated between the UE 120 and the at least one AP 100A, 100B, 100C.

Figure 14:
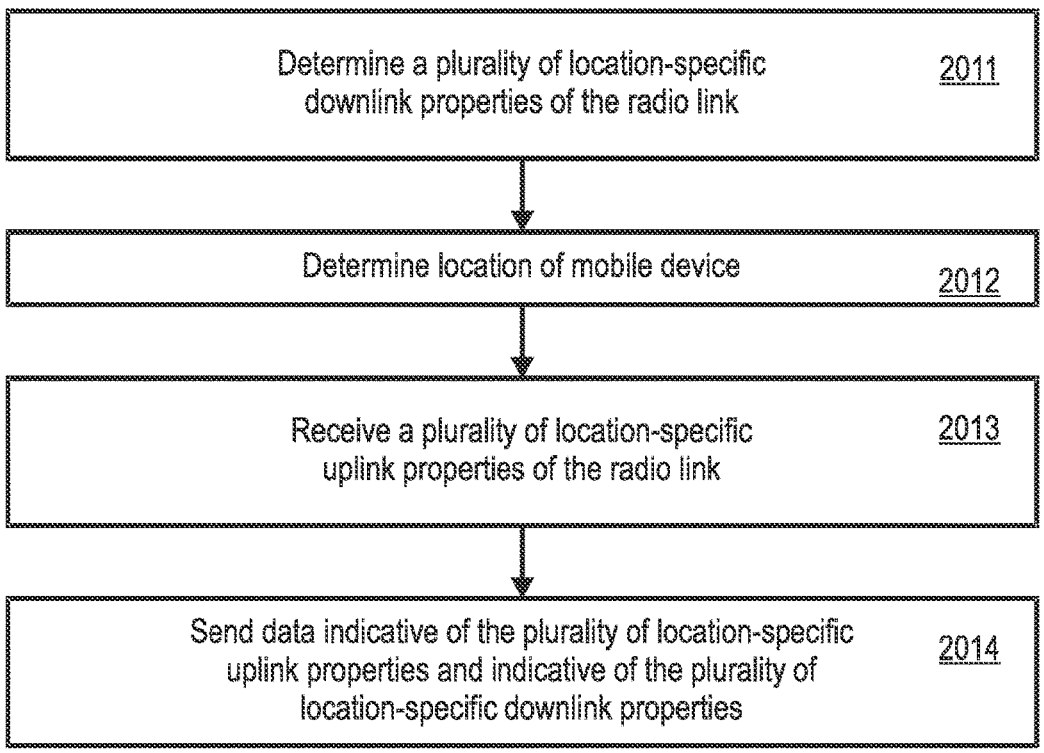
FIG. 14 is a flowchart of a method according to various embodiments.

FIG. 14 is a flowchart of a method according to various embodiments which may be executed by the UE 120.

2011, 2012 generally correspond 2001, 2002.

At 2013, a plurality of location-specific UL properties of the radio link 190 are received, e.g., from the at least one AP 100A, 100B, 100C.

At 2014, data indicative of the plurality of location-specific UL properties as received in 2013 and further indicative of the plurality of location-specific DL properties as determined in 2011 is sent, e.g., to the fingerprint repository node 112.

2011-2013 can be executed a plurality of times at various locations before the data is sent at 2014; in such a scenario, the data sent at 2014 may be indicative of the collected location-specific DL properties and location-specific UL properties 203 of the various locations.

Figure 15:
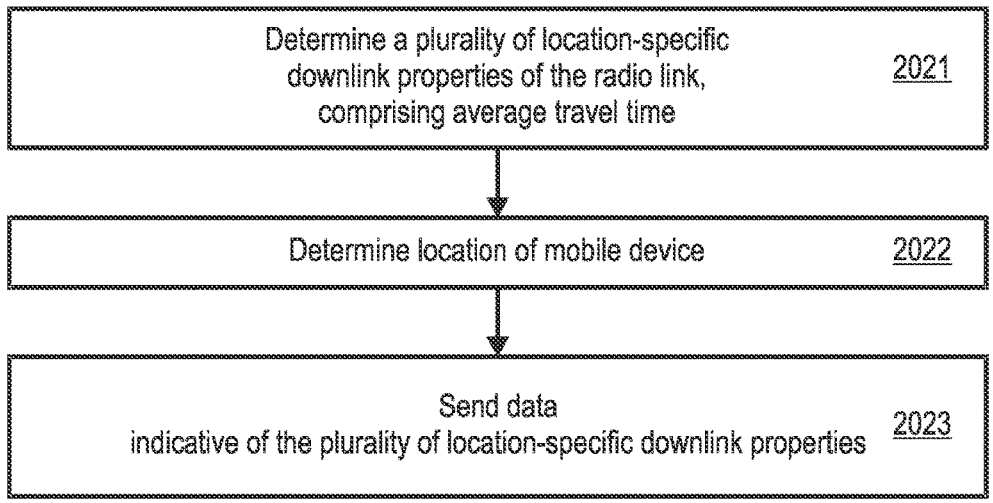
FIG. 15 is a flowchart of a method according to various embodiments.

FIG. 15 is a flowchart of a method according to various embodiments which may be executed by the UE 120.

At 2021, a plurality of location-specific DL properties 203 of the radio link 190 are determined. The plurality of location-specific DL properties 203 of the radio link 190 comprise an average travel time of a plurality of packets communicated via the radio link 190. E.g., the plurality of location-specific DL properties 302 can comprise FTM-based data such that the average travel time of the plurality of packets communicated via the radio link 190.

At 2022 the location of the mobile device is determined. One or more reference positioning techniques as disclosed herein may be employed.

At 2023, data indicative of the plurality of location-specific DL properties as determined in 2021 is sent, e.g., to the fingerprint repository node 112 and/or the at least one AP 100A, 100B, 100C. Alternatively, it would also be possible that instead of sending data indicative of the plurality of location-specific DL properties at 2023, a fingerprint is locally fused at the UE 120, i.e., that 2003 is executed instead of 2023.

Figure 16:
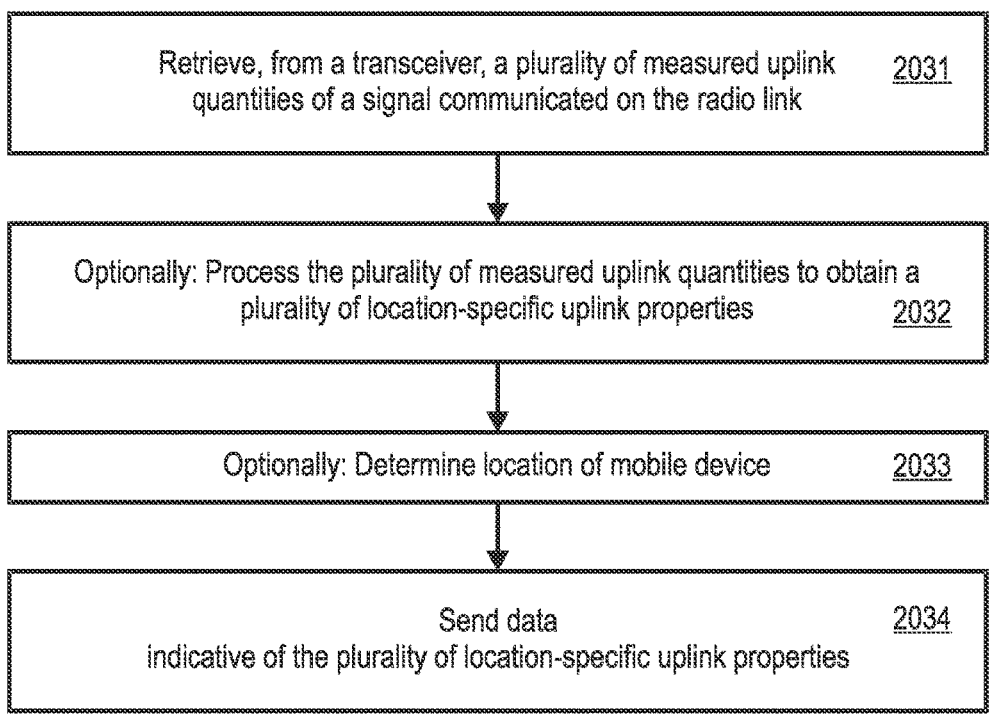
FIG. 16 is a flowchart of a method according to various embodiments.

FIG. 16 is a flowchart of a method according to various embodiments which may be executed by at least one AP 100A, 100B, 100C.

At 2031, a plurality of measured UL quantities is retrieved from the transceiver 104. The UL quantities correspond to raw data.

At 2032, optionally the measured UL quantities are processed to obtain a plurality of location-specific UL properties 203.

At 2033, optionally the location of the UE 120 is determined, e.g., by receiving the location report. One or more reference positioning techniques as disclosed herein may be employed.

At 2034, data indicative of the plurality of location-specific UL properties is sent, e.g., to the UE 120. E.g., the data center 2034 may indicate the measured UL quantities as retrieved in 2031 or may indicate the location-specific UL properties as obtained from said processing of 2032.

Figure 17:
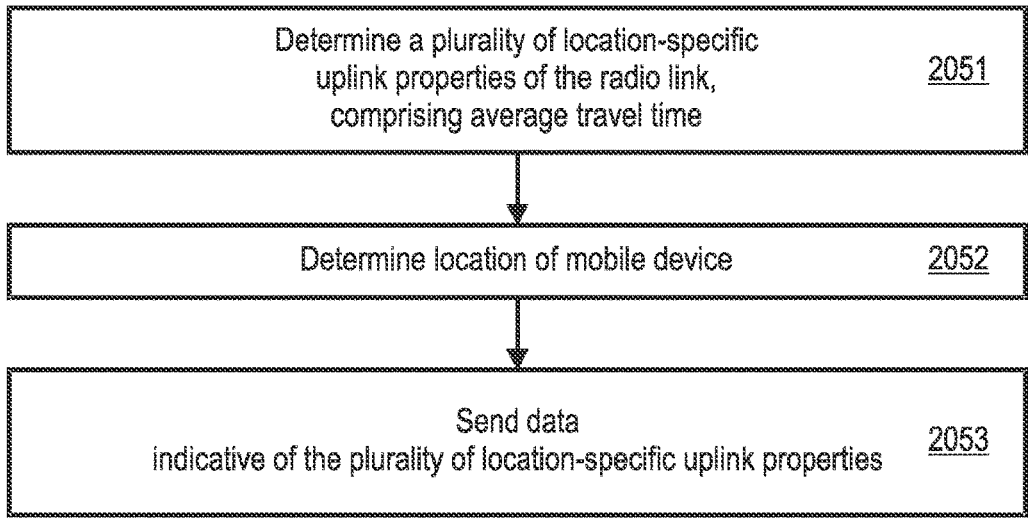
FIG. 17 is a flowchart of a method according to various embodiments.

FIG. 17 is a flowchart of a method according to various embodiments which may be executed by at least one AP 100A, 100B, 100C.

At 2051, the plurality of location-specific UL properties of the radio link 190 are determined, wherein the location-specific UL properties comprise an average travel time of a plurality of packets communicated via the radio link 190. I.e., the location-specific UL properties may include FTM-based data.

2052 generally corresponds to 2033.

2053 generally corresponds to 2034.

Figure 18:
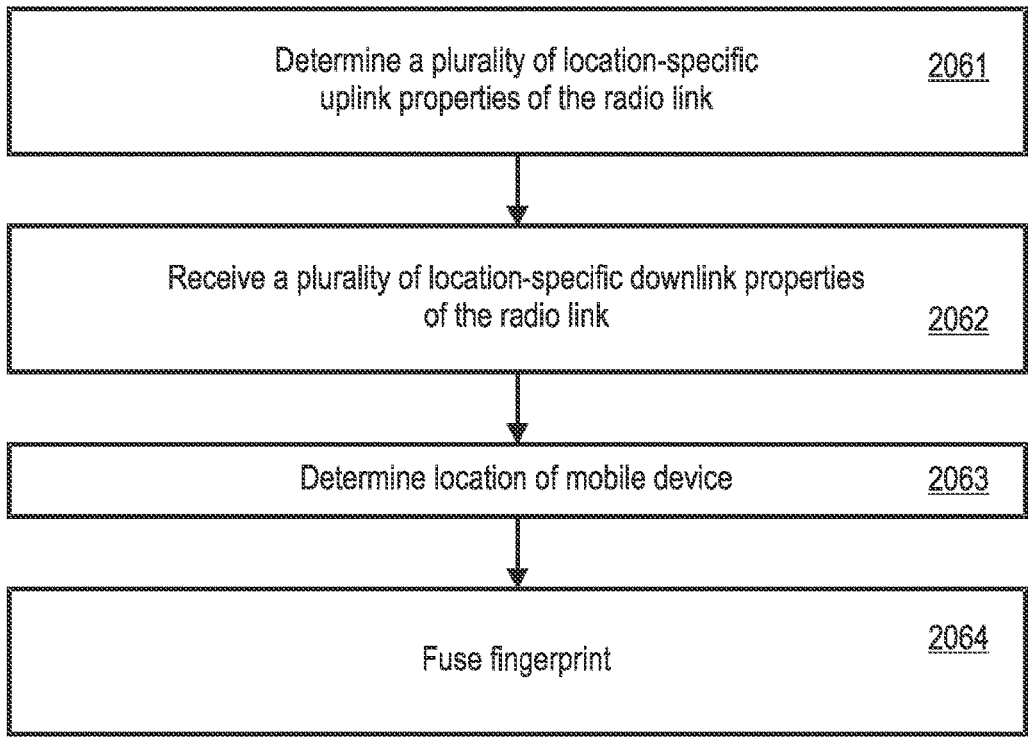
FIG. 18 is a flowchart of a method according to various embodiments.

FIG. 18 is a flowchart of a method according to various embodiments which may be executed by the at least one AP 100A, 100B, 100C.

At 2061, a plurality of location-specific UL properties 203 of the radio link 190 are determined.

At 2062, data indicative of a plurality of location-specific DL properties 203 of the radio link 190 is received, e.g., from the UE 120. In some scenarios, the data received at 2062 may indicate measured DL quantities that have not been processed by the UE 122 to obtain the location-specific DL properties 203; in such a scenario, the corresponding processing can be implemented at the at least one AP 100A, 100B, 100C.

2063 generally corresponds to 2052.

At 2064, the fingerprint 201 is determined by fusing the plurality of location-specific UL properties 203 of the radio link 190 and the plurality of location-specific DL properties 203 of the radio link 190.

Figure 19:
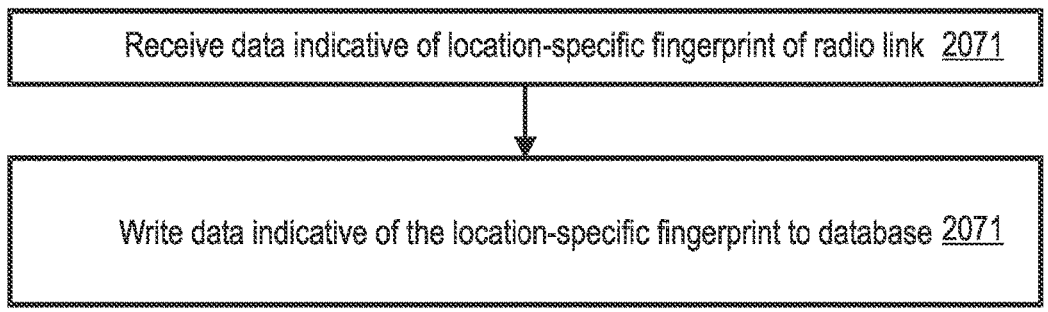
FIG. 19 is a flowchart of a method according to various embodiments.

FIG. 19 is a flowchart according to various embodiments which may be executed by the fingerprint repository node 112.

At 2071, data indicative of a location-specific fingerprint 201 of the radio link 190 is received.

At 2071, the data is received at 2071 is written to the fingerprint database 113.

Figure 20:
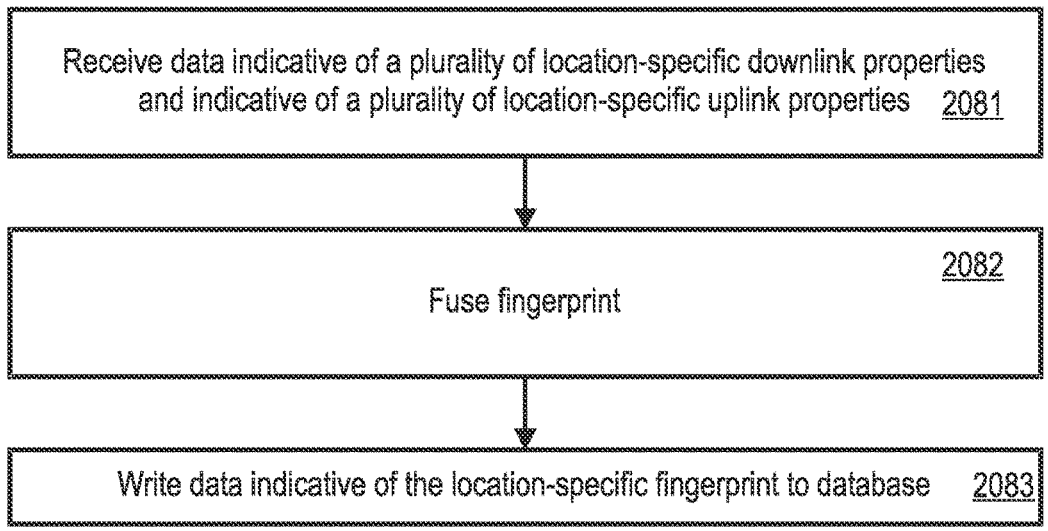
FIG. 20 is a flowchart of a method according to various embodiments.

FIG. 20 is a flowchart of a method according to various embodiments which may be executed by the fingerprint repository node 112.

At 2081, data indicative of a plurality of location-specific DL properties 203 and further indicative of a plurality of location-specific UL properties is received. The data may be received from the UE 120 and/or the at least one AP 100A, 100B, 100C.

At 2082, the fingerprint is fused.

At 2083, data indicative of the fingerprint is written to the fingerprint database 113.

Figure 21:
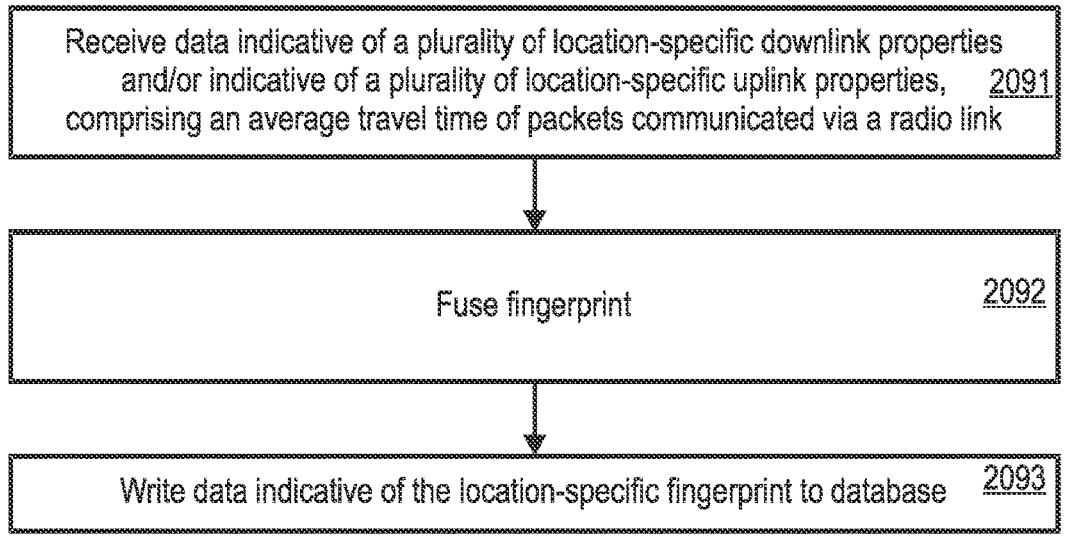
FIG. 21 is a flowchart of a method according to various embodiments.

FIG. 21 is a flowchart of a method according to various embodiments which may be executed by the fingerprint repository node 112.

At 2091, data indicative of location-specific UL properties 203 and/or the location-specific DL properties 203 is received, e.g., from the UE 120 and/or the AP 100A, 100B, 100C. The location-specific UL and/or DL properties 203 comprise an average travel time of a plurality of packets communicated via the radio link 190. E.g., the location-specific UL and/or DL properties 203 can comprise FTM-based data.

2092, 2093 generally correspond to 2082, 2083.

Figure 22:
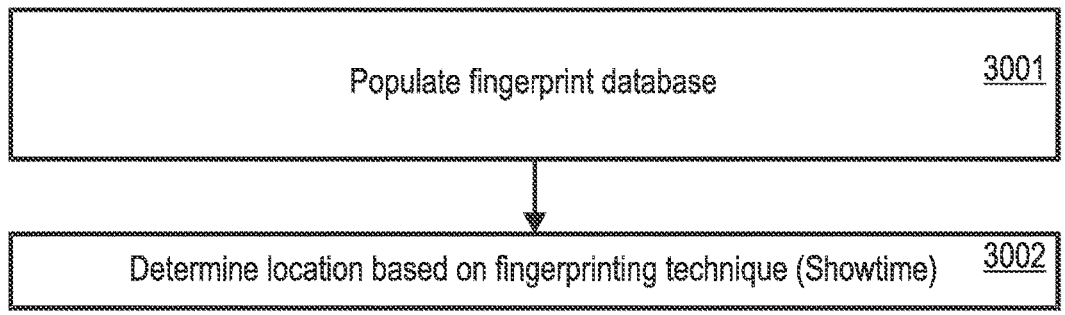
FIG. 22 is a flowchart of a method for populating a fingerprint database and subsequently determine a location based on fingerprinting positioning using the fingerprint database during Showtime.

FIG. 22 is a flowchart of a method illustrating fingerprinting techniques. First, the fingerprinting database 113 is populated, e.g., employing one of the methods as illustrated by the flowcharts of FIGS. 13-21, 3001. 3001 is sometimes referred to as offline stage.

Second, the location of a UE may be determined during Showtime employing the fingerprinting positioning using the fingerprints as provided in the now populated fingerprint database 113, 3002.

Summarizing, above techniques of populating a fingerprint database have been illustrated which enable flexible distribution of logic between various entities. Reference measurements providing the location-specific UL properties of the radio link and/or the location-specific DL properties of the radio link and fingerprint determination allow constructing the fingerprint map for the fingerprinting method; the fingerprinting method that is popularly applied in WLAN/5G indoor positioning. The disclosed techniques enable the reference measurements and fingerprint determination in the offline stage for the fingerprinting method by defining necessary signaling and procedures.

Signaling and procedures for reference positioning techniques and fingerprint calculation are disclosed. The techniques may be applied to populate a fingerprint database for WLAN and/or 5G cellular systems.

In some scenarios, in the offline stage when populating the database, a test UE is utilized to perform reference measurements to construct and maintain the fingerprint map. This is enabled by enhancing control signaling via WLAN and/or 5G radio links for at least the following scenarios:

First: The AP determines the fingerprints based on the measurements at the AP and the reported measurements from the test UE. See, e.g., FIG. 6.

Second: The test UE reports reference measurements. The fingerprint repository node or the AP determines the fingerprints.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For example, while various scenarios have been discussed where an AP and a central controller node are distinct entities, in other scenarios corresponding functionality may be integrated in a single entity. Further, while various scenarios have been discussed where various logic related to populating the fingerprint database resides at the AP, respective practices are readily applicable to scenarios where a central controller node is present.

The invention claimed is:

1. A mobile device, comprising:
a transceiver configured to transceive on a radio link between the mobile device and an access point node,
an interface coupled with at least one processor and configured to communicate with the access point node,
the at least one processor coupled with the transceiver and configured to:
determine a plurality of location-specific downlink properties of the radio link,
determine a location of the mobile device,
receive, via the interface from the access point node, data indicative of a plurality of location-specific uplink properties of the radio link, the plurality of location-specific uplink properties being associated with the determined location of the mobile device, and
fuse the plurality of location-specific uplink properties and the plurality of location-specific downlink properties to obtain a location-specific fingerprint of the radio link associated with the determined location of the mobile device.

2. The mobile device of claim 1,
wherein the data indicative of the plurality of location-specific uplink properties comprises a plurality of measured uplink quantities of a signal communicated on the radio link,
wherein the at least one processor is configured to process the plurality of measured uplink quantities to obtain the plurality of location-specific uplink properties.

3. The mobile device of claim 1,
an interface coupled with the at least one processor and configured to communicate with a fingerprint repository node,
wherein the at least one processor is configured to send, via the interface, data indicative of the location-specific fingerprint towards the fingerprint repository node to write the data indicative of the location-specific fingerprint to a database.

4. The mobile device of claim 1,
wherein the interface is configured to communicate via the radio link.

5. The mobile device of claim 1,
wherein the plurality of location-specific downlink properties comprises an average travel time of a plurality of packets communicated via the radio link.

6. The mobile device of claim 5,
wherein the average travel time has an accuracy on the order of at least 1 nanosecond.

7. The mobile device of claim 5,
wherein the at least one processor is configured to determine the average travel time based on a Wireless Local Area Network Fine Timing Measurement technique.

8. The mobile device of claim 1,
wherein the plurality of location-specific downlink properties comprise elements selected from the group comprising: a signal strength of a signal received by the transceiver via the radio link; a round-trip time of at least one packet communicated via the radio link; an angle of arrival of a signal received by the transceiver via the radio link; and a cell identification of the access point node.

9. The mobile device of claim 1,
wherein the at least one processor is configured to retrieve, from the transceiver, a plurality of measured downlink quantities of a signal communicated on the radio link,
wherein the at least one processor is configured to process the plurality of measured downlink quantities to obtain the plurality of location-specific downlink properties.

10. The mobile device of claim 1,
wherein the radio link is a Wireless Local Area Network radio link.

11. The mobile device of claim 1, wherein the radio link is a cellular mobile communications network radio link.

12. The mobile device of claim 1, further comprising:
an inertial navigation system,
wherein the at least one processor is configured to determine the location of the mobile device based on an output of the inertial navigation system.

13. A method, comprising:
determining a plurality of location-specific downlink properties of a radio link between a mobile device and an access point node,
determining a location of the mobile device,
receiving, from the access point node, data indicative of a plurality of location-specific uplink properties of the radio link, the plurality of location-specific uplink properties being associated with the determined location of the mobile device, and
fusing the plurality of location-specific uplink properties and the plurality of location-specific downlink properties to obtain a location-specific fingerprint of the radio link associated with the determined location of the mobile device.

14. The method of claim 13,
wherein the data indicative of the plurality of location-specific uplink properties comprises a plurality of measured uplink quantities of a signal communicated on the radio link,
wherein the method further comprises:
processing the plurality of measured uplink quantities to obtain the plurality of location-specific uplink properties.

15. The method of claim 13, further comprising:
sending data indicative of the location-specific fingerprint towards a fingerprint repository node to write the data indicative of the location-specific fingerprint to a database.

16. The method of claim 13,
wherein said sending and/or receiving of the data is via the radio link.

17. The method of claim 13,
wherein the plurality of location-specific downlink properties comprises an average travel time of a plurality of packets communicated via the radio link.

18. The method of claim 17,
wherein the average travel time has an accuracy on the order of at least 1 nanosecond.

19. The method of claim 17,
wherein the average travel time is determined based on a Wireless Local Area Network Fine Timing Measurement technique.

20. The method of claim 13,
wherein the plurality of location-specific downlink properties comprise elements selected from the group comprising: a signal strength of a signal received by the transceiver via the radio link; a round-trip time of at least one packet communicated via the radio link; an angle of arrival of a signal received by the transceiver via the radio link; and a cell identification of the access point node.

21. The method of claim 13, further comprising:
retrieving, from a transceiver of the mobile device, a plurality of measured downlink quantities of a signal communicated on the radio link,
wherein the at least one processor is configured to process the plurality of measured downlink quantities to obtain the plurality of location-specific downlink properties.

22. The method of claim 13,
wherein the radio link is a Wireless Local Area Network radio link.

23. The method of claim 13,
wherein the radio link is a cellular mobile communications network radio link.

24. The method of claim 13,
wherein the location of the mobile device is determined based on an output of an inertial navigation system of the mobile device.

* * * * *